US008463672B2

(12) United States Patent
Sharma et al.

(10) Patent No.: US 8,463,672 B2
(45) Date of Patent: Jun. 11, 2013

(54) METHOD AND APPARATUS FOR FACILITATING INTERIM BILLING FOR IMS SESSION USING TIME-BASED INTERIM ACCOUNTING MESSAGE TO DETERMINE INTERIM PROCESSING TRIGGER

(75) Inventors: Ranjan Sharma, New Albany, OH (US); Luc T'Syen, Herselt (BE)

(73) Assignee: Alcatel Lucent, Paris (FR)

( * ) Notice: Subject to any disclaimer, the term of this patent is extended or adjusted under 35 U.S.C. 154(b) by 312 days.

(21) Appl. No.: 12/877,367

(22) Filed: Sep. 8, 2010

(65) Prior Publication Data
US 2012/0059749 A1 Mar. 8, 2012

(51) Int. Cl.
*G07F 19/00* (2006.01)
*H04M 15/00* (2006.01)

(52) U.S. Cl.
USPC .......................................... 705/34; 379/112.1

(58) Field of Classification Search
USPC ............................... 705/16, 34; 235/379, 380
See application file for complete search history.

(56) References Cited

U.S. PATENT DOCUMENTS

| 6,330,312 | B1* | 12/2001 | Wright et al. | 379/112.06 |
| 2006/0258331 | A1* | 11/2006 | Syrett et al. | 455/405 |
| 2007/0111706 | A1* | 5/2007 | Kumar et al. | 455/406 |

OTHER PUBLICATIONS

Stefano Gioia and Tomasz Radziszewski, Understanding the IMS Charging Architecture, Jul. 25, 2007, http://www.oracle.com/technetwork/articles/entarch/imc-charging-architecture-092946.html.*

3GPP TS 32.295 V6.1.0; 3rd Generation Partnership Project; Technical Specification Group Services and System Aspects; Telecommunication management; Charging management; Charging Data Record (CDR) transfer; (Release 6); Jun. 2005; 32 pages.
3GPP TS 32.240 V7.0.0; 3rd Generation Partnership Project; Technical Specification Group Services and System Aspects; Telecommunication management; Charging management; Charging architecture and principles; (Release 7); Sep. 2006; 39 pages.
RFC 3588; Diameter Base Protocol; Calhoun et al.; Sep. 2003; 147 pages.
U.S. Appl. No. 12/418,206, filed Apr. 3,2009; Interim Billing for Sessions in IMS Networks; 21 pages.
PCT Patent Application Serial No. PCT/US09/40197, filed Apr. 10, 2009, Distributive Correlation of Charging Records Across Network Domains, 31 pages.

* cited by examiner

*Primary Examiner* — Matthew Gart
*Assistant Examiner* — Rokib Masud
(74) *Attorney, Agent, or Firm* — Fay Sharpe LLP

(57) ABSTRACT

A method and charging system for facilitating interim billing for an IMS session is provided. The method may include receiving time-based interim accounting messages at CDFs from NEs (i.e., CTFs) of an IMS network serving an IMS session, opening or updating interim CDRs for each NE serving the IMS session based on the time-based interim accounting messages, extracting accounting record numbers from the time-based interim accounting messages, the accounting record numbers uniquely identifying the time-based interim accounting message in relation to other interim accounting messages from the corresponding NE for the IMS session, and determining if a partial record closing trigger has been reached for the IMS session, wherein the interim processing trigger is a function of the accounting record number extracted from the time-based interim accounting message for the corresponding NE, an AII value, and a partial record closing threshold.

12 Claims, 22 Drawing Sheets

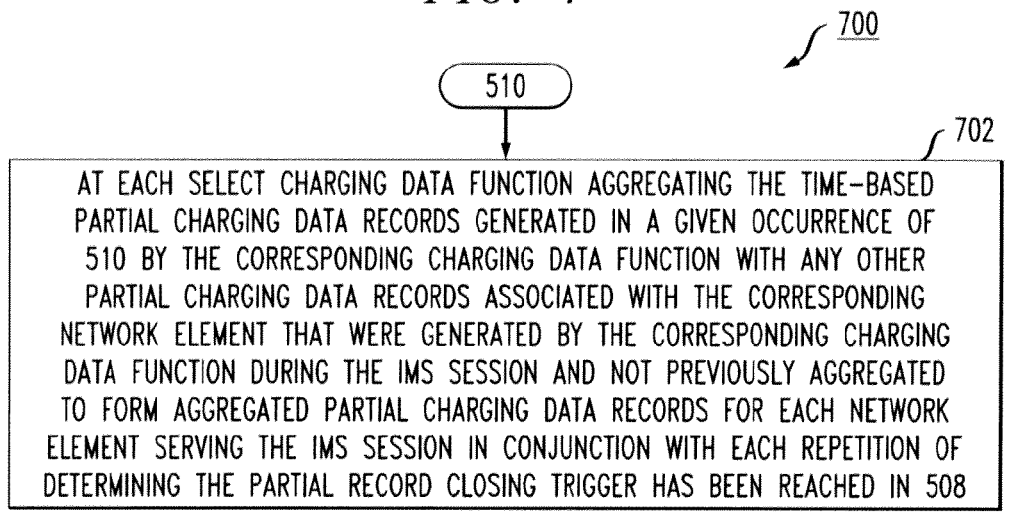
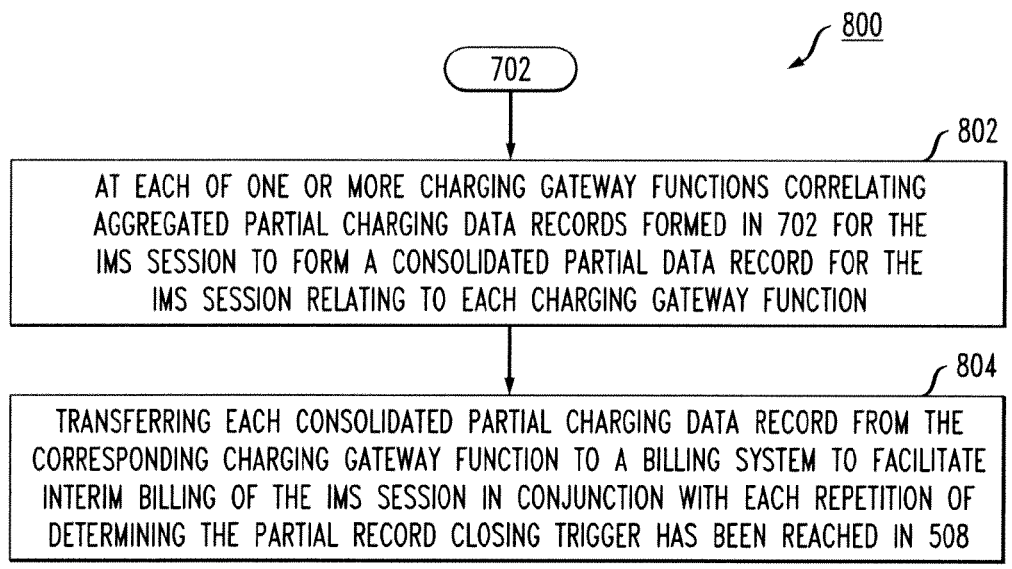

AII USAGE - AII SHOULD BE ADJUSTED TO TAKE PREVIOUS DELAYS/FAILURES INTO ACCOUNT

AII USAGE - AII SHOULD BE ADJUSTED TO TAKE PREVIOUS DELAYS/FAILURES INTO ACCOUNT

METHOD AND APPARATUS FOR FACILITATING INTERIM BILLING FOR IMS SESSION USING TIME-BASED INTERIM ACCOUNTING MESSAGE TO DETERMINE INTERIM PROCESSING TRIGGER

BACKGROUND

This disclosure relates to a method and charging system for facilitating interim billing for an internet protocol (IP) multimedia subsystem (IMS) session. For example, this disclosure describes exemplary embodiments of a charging system with charging data subsystems that release time-based partial charging data records (CDRs) for each IMS network element (NE) serving an IMS session based on time-based interim accounting messages and an interim processing trigger. As disclosed herein, the interim processing trigger may be a function of message sequence numbers (e.g., accounting record numbers) extracted from the time-based interim accounting messages, a message interval value (e.g., accounting-interim-interval (AII) value), and an interim processing threshold (e.g., partial record closing threshold). The charging data subsystems may aggregate the partial CDRs for each NE in conjunction with the interim processing trigger. Similarly, charging gateway subsystems may correlate the aggregated partial CDRs for the IMS session in conjunction with the interim processing trigger. If charging data subsystems develop fault conditions, the process continues in synchronous fashion using the interim processing trigger in conjunction with alternate peer charging data subsystems.

By way of background, the correlation of CDRs in IMS networks using a charging collection function (CCF) is typically initiated when the session ends. Thus, closing and correlating CDRs is not handled well for long duration calls (LDCs) (i.e., IMS sessions). LDC is a term that connotes both voice calls and/or data sessions. LDCs present a problem to billing systems (BSs) and service providers because a data session may be active for a long period of time. For example, for always-on devices in particular, a data session may stretch across several days. In such cases, the BS may not be able to get CDRs (or bill for the session) until after the data session is finished. This poses a revenue recognition issue if the session crosses a billing cycle (e.g., month) boundary because the session would not be billed to the subscriber until the billing cycle in which the session ended. In addition, a failure of the CCF may preclude the CDR from being submitted to the billing mediation at all which would result in revenue leakage.

One solution to the above problem is disclosed in U.S. patent application Ser. No. 12/418,206, filed Apr. 3, 2009, and provides interim billing for sessions in IMS networks. The entire contents of the '206 application are incorporated herein by reference. The process for interim billing in the '206 application includes: i) automatic session demarcation via triggering aggregation, ii) automatic initiation of correlation, iii) generation of a correlated CDR for part of the session, iv) shipping the CDR to the BS, and v) continuing with the session-related charging until the next interval (or the session completion—whichever occurs next). This provides for a mechanism to let the CCF parcel off interim CDRs, aggregate and correlate the interim CDRs and send them to the BS for partial session accounting. Session demarcation is handled at each CCF. However, an improved mechanism for handling these situations would be desirable.

Another related process is disclosed in PCT Patent Application No. PCT/US2009/040197, filed Apr. 10, 2009, and provides distributive correlation of charging records across network domains. The entire contents of the '40197 PCT application are incorporated herein by reference.

These existing techniques for billing functions for IMS services may work well for sunny-day scenarios. However, improved techniques that are fault-tolerant would be desirable. For example, existing techniques break down for failovers induced by CCF overloads and for CCF failures. This is because LDC timers are maintained locally on each server specific to each session. A session-handover in case of a CCF failure or overload passes the session to a new CCF, which is typically not cognizant of the duration of the ongoing session, or when the last LDC interval arrived on the previous server for the session. LDC boundaries are not respected for handed-off sessions and the expected aggregated/correlated CDR is not produced at the expected interval.

To illustrate this point, assume there are two charging trigger functions (CTFs) and three CCFs in a network. The two CTFs are an application server (AS) and a serving call session control function (S-CSCF) and the CCFs are numbered CCF1 through CCF3. Further, assume a value of 't' as 15 minutes and the operator chooses a value of 6 hours (H) for 'T'. In other words, 'T' is 24 times 't'. As the call or session is set up, both CTFs start sending accounting requests (ACRs) to the CCFs. For example, assume that AS sends ACRs to CCF1 and S-CSCF sends ACRs to CCF3. In the normal run (i.e., in the absence of any outages), both CCF1 and CCF3 initiate a count-down timer with a value of 6 H for the session and initiate an aggregation and correlation every 6 H. However, when any CCF develops a problem (e.g., overload, out-of-service (OOS), network connectivity issue, etc.), the scenario changes as shown in the FIG. 1.

With reference to FIG. 1, upon a session start at 1 H, CCF1 and CCF3 start the LDC timer (e.g., 6 H). CCF1 fails at 2 H. In the worst case, AS gets no accounting answer (ACA) for its ACR driven by AII timer for 2-3 successive attempts. AS executes a failover to CCF2. CCF2 gets the first ACR at, e.g., 2:20 with a timestamp of 2:05. CCF2 initiates an LDC timer for 6 H from 2:05. At 7 H, the LDC timer at CCF3 fires. However, AS data from 1 H to 2 H is not available (CCF1 is OOS) and CCF2 LDC has not yet counted down to zero. CCF3 starts another LDC timer for the session. At 8:05, the LDC timer at CCF2 fires. However, at this time, the S-CSCF timer is still counting down. This out-of-sync behavior continues until the end of the session.

To re-synchronize out-of-sync CCFs, the previous techniques could use inter-CCF communication for each of the ongoing sessions for "trigger distribution" to induce time-related aggregation and correlation commencement on the servers. However, inter-CCF communication is a performance impediment for the CCF servers because, at any time, there can be thousands of sessions in progress and inter-CCF communication takes the form of M*N messages, where M denotes number of ongoing sessions and N denotes the number of CCF servers. It is not desirable to incur the overhead of the large amount of messaging involved because the processing of these administrative messages impacts the performance throughput of the CCF adversely.

Moreover, maintenance of the LDC timer is a CCF responsibility. This means that each CCF has to start an LDC timer for each of the ongoing sessions that it receives accounting messages. Given the extreme processing load in today's data networks supporting flow-based bearer charging, as in evolved high rate packet data (eHRPD) and long term evolution (LTE) networks, this additional processing requirement on the CCF takes away valuable central processing unit (CPU) cycles and thereby adversely affects system throughput measured in transactions per second (TPS).

Based on the foregoing, a charging system that simplifies processing overhead for generation, aggregation, and correlation of partial charging records in relation to interim billing of IMS sessions is desirable. Additionally, a charging system that is fault tolerant for at least charging data subsystem fault conditions is desirable.

SUMMARY

In one aspect, a method for facilitating interim billing for an IMS session is provided. In one embodiment, the method includes a trigger determining process and a repeating or generating step. An exemplary embodiment of the trigger determining process includes: receiving time-based interim accounting messages for an IMS session at select charging data functions (CDFs) from NEs of an IMS network that are serving the IMS session, opening or updating interim CDRs for each NE serving the IMS session at the select CDFs in response to receiving the time-based interim accounting messages, extracting accounting record numbers from the time-based interim accounting messages at the select CDFs, the accounting record numbers uniquely identifying the corresponding time-based interim accounting message in relation to other interim accounting messages from the corresponding NE for the IMS session, and determining if a partial record closing trigger has been reached at the select CDFs for the IMS session, wherein the interim processing trigger may be a function of the corresponding extracted accounting record number, an AII value accessible to the select CDFs, and a partial record closing threshold accessible to the select CDFs. An exemplary embodiment of the repeating or generating step includes: if the partial record closing trigger has not been reached and the IMS session is still active, repeating the trigger determining process to continue processing time-based interim accounting messages to update the current interim CDRs or, if the partial record closing trigger has been reached, generating time-based partial CDRs for each NE serving the IMS session at the select CDFs from the corresponding interim CDRs opened and updated by the corresponding select CDFs since any preceding time-based partial CDR was generated and repeating the trigger determining process and the repeating or generating step to continue processing time-based interim accounting messages and generating additional time-based partial CDRs until the corresponding NE is no longer serving the IMS session or the corresponding select CDF experiences a fault condition.

In another aspect, an apparatus for facilitating interim billing for an IMS session is provided. In one embodiment, the apparatus includes: i) a first primary charging data subsystem operable to receive time-based interim accounting messages for an IMS session from a first NE of an IMS network serving the IMS session for opening or updating a first interim CDR in response to receiving the time-based interim accounting messages, extracting accounting record numbers from the time-based interim accounting messages, and determining if a partial record closing trigger has been reached for the IMS session and ii) a second primary charging data subsystem operable to receive time-based interim accounting messages for the IMS session from a second NE of the IMS network serving the IMS session for opening or updating a second interim CDR in response to receiving the time-based interim accounting messages, extracting accounting record numbers from the time-based interim accounting messages, and determining if a partial record closing trigger has been reached for the IMS session. The accounting record numbers uniquely identify the corresponding time-based interim accounting message in relation to other interim accounting messages from the corresponding NE for the IMS session. The partial record closing trigger may be a function of the accounting record number extracted by the corresponding charging data subsystem for the corresponding NE, an AII value accessible to the corresponding charging data subsystem, and a partial record closing threshold accessible to the corresponding charging data subsystem. If the partial record closing trigger has not been reached and the IMS session is still active, the first and second primary charging data subsystems continue processing time-based interim accounting messages to update the current first and second interim CDRs. Conversely, if the partial record closing trigger has been reached, the first primary charging data subsystem generates a first time-based partial CDR for the first NE from the first interim CDRs opened and updated by the first primary charging data subsystem since any preceding first time-based partial CDR was generated and continues processing time-based interim accounting messages and generating additional first time-based partial CDRs until the first NE is no longer serving the IMS session or the first primary charging data subsystem experiences an overload or OOS condition. Likewise, if the partial record closing trigger has been reached, the second primary charging data subsystem generates a second time-based partial CDR for the second NE from the second interim CDRs opened and updated by the first primary charging data subsystem since any preceding first time-based partial CDR was generated and continues processing time-based interim accounting messages and generating additional second time-based partial CDRs until the second NE is no longer serving the IMS session or the second primary charging data subsystem experiences a fault condition In yet another aspect, a method for facilitating interim billing for an IMS session is provided. In one embodiment, the method includes a trigger determining process and a repeating or generating step. An exemplary embodiment of the trigger determining process includes: opening or updating an interim CDR at a CDF in response to receiving a time-based interim accounting message for an IMS session from a NE of an IMS network serving the IMS session, extracting a message sequence number from the time-based interim accounting message, the message sequence number uniquely identifying the time-based interim accounting message in relation to other interim accounting messages from the NE for the IMS session, and determining if an interim processing trigger has been reached at the CDF for the IMS session, wherein the interim processing trigger may be a function of the extracted message sequence number, a message interval value accessible to the CDF, and an interim processing threshold accessible to the CDF. An exemplary embodiment of the repeating or generating step includes: if the interim processing trigger has not been reached and the IMS session is still active, repeating the trigger determining process to continue processing time-based interim accounting messages to update the current interim CDR or, if the interim processing trigger has been reached, generating a time-based partial CDR at the CDF from the interim CDRs opened and updated by the corresponding CDF since any preceding time-based partial CDR was generated and repeating the trigger determining process and the repeating or generating step to continue processing time-based interim accounting messages and generating additional time-based partial CDRs until the NE is no longer serving the IMS session or the charging data subsystem experiences an overload or OOS condition.

In still another aspect, an apparatus for facilitating interim billing for an IMS session is provided. In one embodiment, the apparatus includes a first primary charging data subsystem operable to receive time-based interim accounting messages for an IMS session from a first NE of an IMS network serving the IMS session, the first primary charging data subsystem. The first primary charging data subsystem includes: i) a first interim record processing module for opening or updating a primary interim CDR in response to receiving the time-based interim accounting messages for the IMS session from the first NE, ii) a first message parsing module in operative communication with the first interim record processing module for extracting a message sequence number from the time-based interim accounting messages, the message sequence number uniquely identifying each time-based interim accounting message in relation to other interim accounting messages from the first NE for the IMS session, and iii) a first time-based record processing module in operative communication with the first interim record processing module and first message parsing module for determining if an interim processing trigger has been reached for the IMS session, wherein the interim processing trigger may be a function of the message sequence number, a message interval value accessible to the first time-based record processing module, and an interim processing threshold accessible to the first time-based record processing module. If the interim processing trigger has not been reached and the IMS session is still active, the first primary charging data subsystem continues processing time-based interim accounting messages to update the current primary interim CDR. Conversely, if the interim processing trigger has been reached, the first time-based record processing module generates a primary time-based partial CDR from the primary interim CDRs opened and updated by the first interim record processing module since any preceding primary time-based partial CDR was generated and the first primary charging data subsystem continues processing time-based interim accounting messages and generating additional primary time-based partial CDRs until the first NE is no longer serving the IMS session or the first primary charging data subsystem experiences an overload or OOS condition.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 7, in conjunction with FIG. 5, is a flow chart of yet another exemplary embodiment of a process for facilitating interim billing for an IMS session;

FIG. 8, in conjunction with FIGS. 5 and 7, is a flow chart of still another exemplary embodiment of a process for facilitating interim billing for an IMS session;

DETAILED DESCRIPTION

Figure 1:
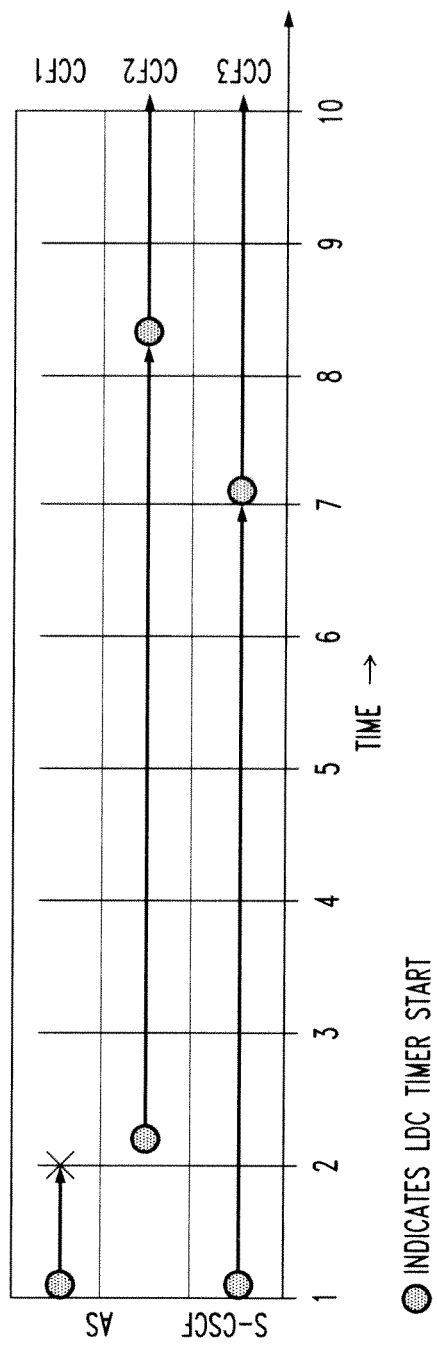
FIG. 1 is a timing diagram for an existing charging system that shows out-of-sync generation of partial CDRs in view of a CCF failure.

Various embodiments of methods and charging systems for facilitating interim billing for an IMS session are disclosed herein. Certain embodiments include charging data subsystems that release time-based partial CDRs for each IMS NE serving an IMS session based on time-based interim accounting messages and an interim processing trigger. The interim processing trigger may be a function of message sequence numbers (e.g., accounting record numbers) extracted from the time-based interim accounting messages, a message interval value (e.g., AII value), and an interim processing threshold (e.g., partial record closing threshold). The charging data subsystems may aggregate the partial CDRs for each NE in conjunction with the interim processing trigger. The aggregated partial CDRs may be provided to a BS. Similarly, charging gateway subsystems in the charging system may correlate the aggregated partial CDRs for the IMS session in conjunction with the interim processing trigger. The correlated partial CDRs may be provided to the BS. If charging data subsystems develop fault conditions, the process continues in synchronous fashion using the interim processing trigger in conjunction with alternate peer charging data subsystems. A media change feature may be provided in the charging system to adjust message sequence numbers in time-based interim accounting messages to compensate for any media-based interim accounting messages in the IMS session. A time stamp feature may be provided in the charging system to determine the interim processing trigger from a time stamp in time-based interim accounting messages to facilitate operations when a failover operation occurs between a starting accounting message and the first time-based interim accounting message. A failover adjustment feature may be provided in the charging system to temporarily adjust the timing interval for time-based interim accounting messages to compensate for retry delays associated with failover operations.

For example, using the various embodiments of methods and charging systems disclosed herein for an IMS session that extends across a billing cycle, a BS for an IMS service provider may use partial CDRs collected prior to the end of the billing cycle to produce an interim bill for the IMS session. In this example, the BS may use the partial CDRs collected after the end of the prior billing cycle to produce a final bill for the IMS session in conjunction with the billing cycle in which the IMS session ends.

The charging system may include a stack of CDFs and a stack of charging gateway functions (CGFs). The CDFs and CGFs may be arranged in CDF/CGF pairs. Each CDF/CGF pair may also be referred to as a CCF. IMS NEs may send accounting messages to multiple CDFs for purposes of redundancy. Similarly, CDFs may send aggregated partial CDRs to multiple CGFs for purposes of redundancy. IMS NEs, for example, send accounting and charging information via Diameter Rf messages (e.g., ACR [start], ACR [interim] time limit, ACR [interim] media change, ACR [stop], and ACR [event]) to the CDF. For additional information on Diameter messages, see RFC 3588 Diameter Base Protocol, the entire contents of which are incorporated herein by reference. The CDF creates CDRs based on ACR messages received.

Figure 2:
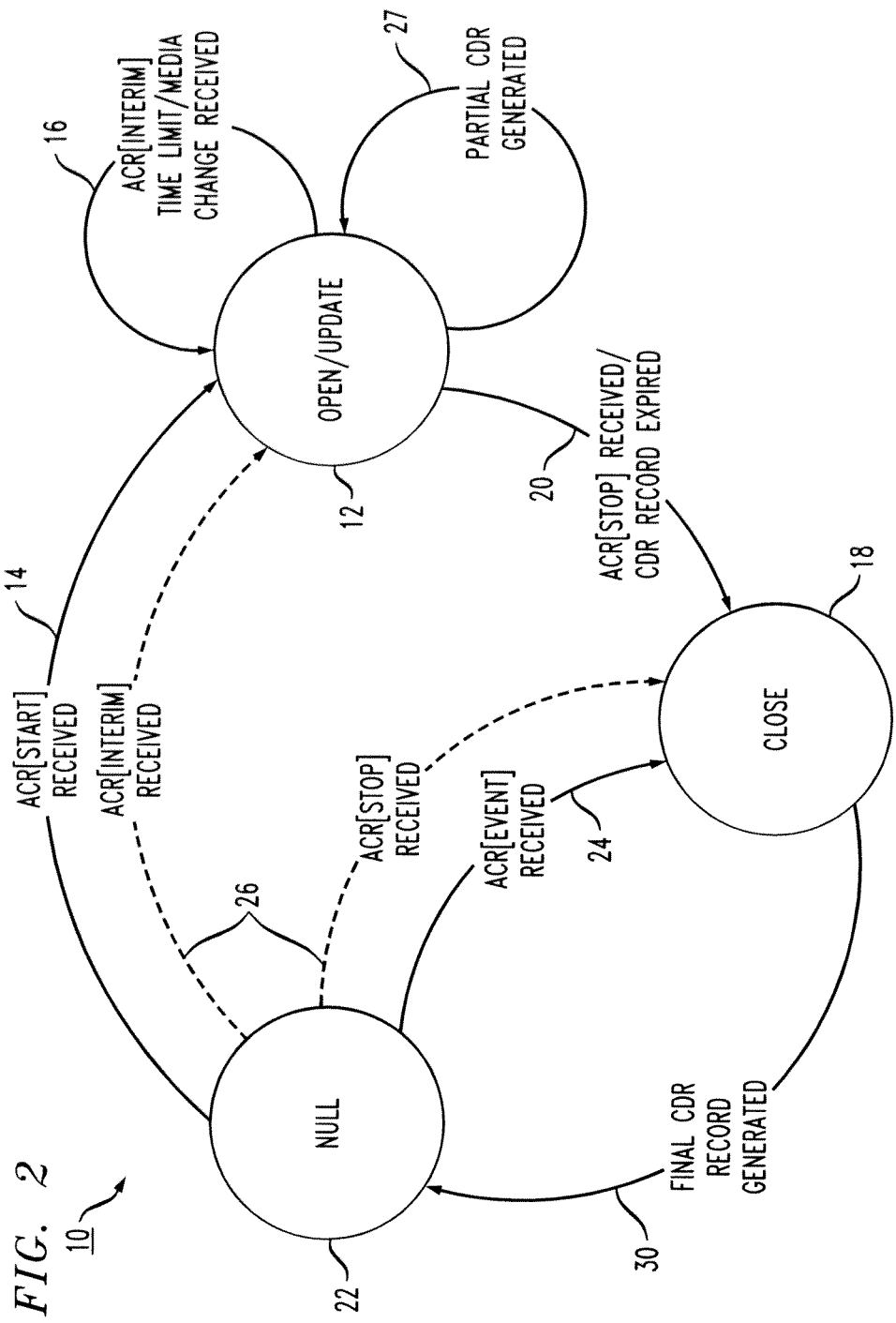
FIG. 2 is a state diagram of an exemplary embodiment of a process for facilitating interim billing for an IMS session.

Referring now to the drawings wherein the showings are for purposes of illustrating the exemplary embodiments only and not for purposes of limiting the claimed subject matter, FIG. 2 depicts an exemplary embodiment of a CDR generation process formulated as a finite state machine (FSM) 10, where a CDR is <<opened>> 12 or <<initiated>> upon receipt of an accounting start request 14 (e.g., ACR [start] Diameter Rf message). A CDR may also be <<opened>> 12 or <<initiated>> upon receipt of a first time-based accounting interim request 26 (e.g., ACR [interim] time limit Diameter Rf message) by a secondary or alternate peer CCF without receiving an accounting start request 14 in conjunction with overload or OOS conditions in the primary CCF and failover operations by the corresponding NE. The CDR is updated 12 each time a time-based accounting interim request 16 (e.g., ACR [interim] time limit Diameter Rf message) is received. For session-related CDRs, the CDR is completed 18 upon receipt of an accounting stop request 20 (e.g., ACR [stop] Diameter Rf message). For non-session related accounting 22, events are utilized via the corresponding NE sending an accounting event request 24 (e.g., ACR [event] Diameter Rf message). The dashed lines 26 in FIG. 2 identify error cases that result in incomplete CDRs.

Another type of accounting interim message 16 (e.g., ACR [interim] media change) may be associated with a service or media change. Each media-based accounting interim message also triggers the generation of a partial CDR 27 on the CDF. If a session results in multiple partial CDRs, the aggregation function available on the CDF 12, upon determination that the session has ended 30, the CDF combines the partial CDRs into an aggregated (i.e., final) CDR 30 specific to a particular NE. Upon session end, the correlation function, which is typically available on the CGF, provides a consolidated CDR by combining final (i.e., aggregated) CDRs 30 from each NE participating in the IMS session. The end result is that the BS is provided with a single correlated CDR that represents the charging for the complete session.

Figure 3:
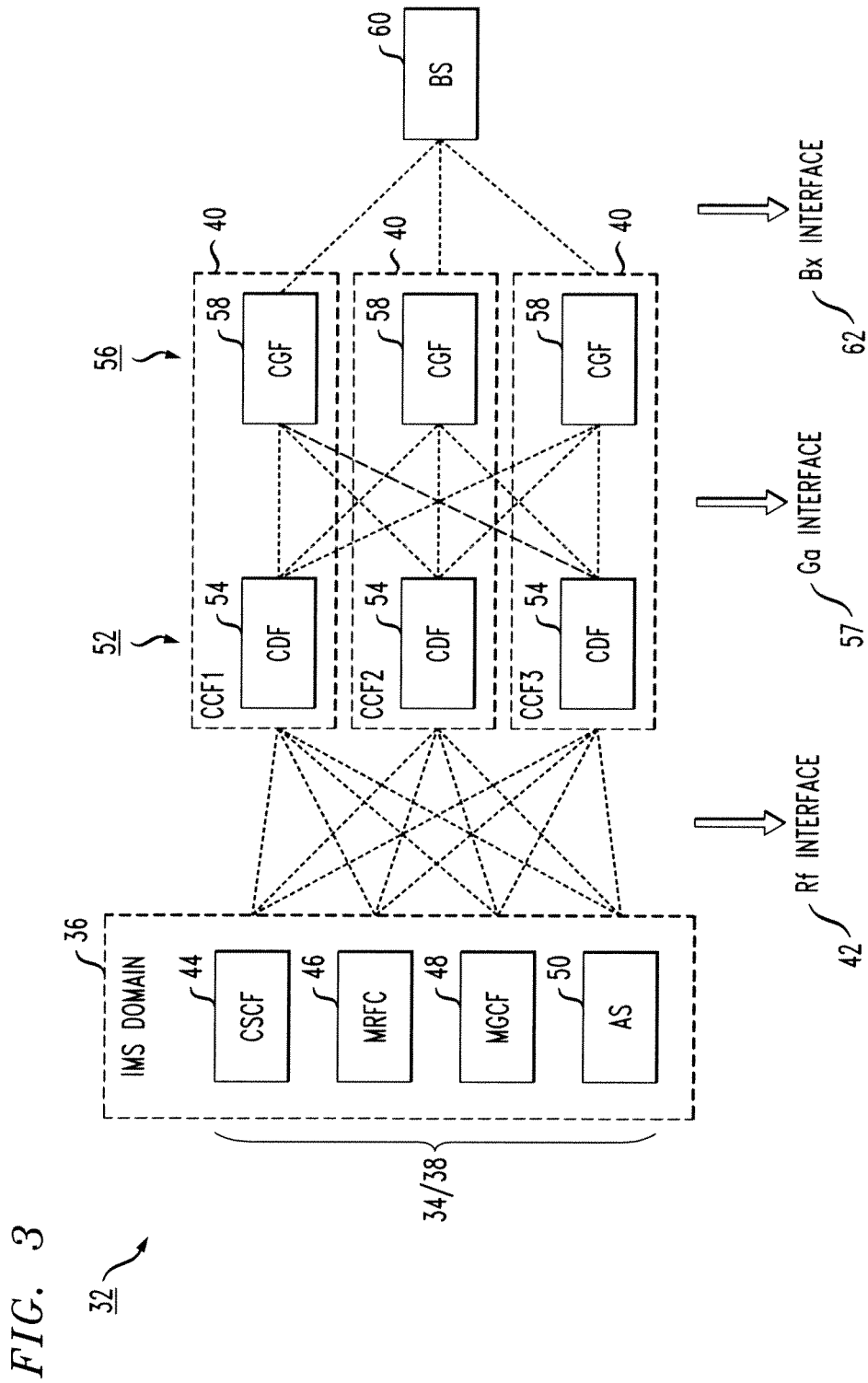
FIG. 3 is a block diagram of an exemplary embodiment of a charging system for facilitating interim billing for an IMS session.

With reference to FIG. 3, an exemplary embodiment of a charging system 32 is depicted in hierarchical architecture showing various messaging options. For additional information on charging architecture, see 3GPP TS 32.240 Charging Architecture and Principles, the entire contents of which are incorporated herein by reference. NEs 34 from IMS domain 36 can be set up as CTFs 38 to provide or suppress charging information to the CCFs 40. Each NE 34 provides charging information to a designated primary CCF 40 during normal operations. Upon detection of overload or OOS conditions in the primary CCF 40, the corresponding NE 34 provides charging information to a designated secondary CCF 40 in accordance with a failover process. Upon detection of overload or OOS conditions in the secondary CCF 40, the corresponding NE 34 provides charging information to a designated alternate CCF 40 in accordance with the failover process. Upon detection of overload or OOS conditions in designated alternate CCFs 40, the corresponding NEs 34 provide charging information to further designated alternate CCFs 40 in accordance with the failover process. NE 34 sends the charging information using an Rf reference point 42 (e.g., Diameter base protocol). In the exemplary diagram, a call session control function (CSCF) 44, media resource function control (MRFC) 46, media gateway control function (MGCF) 48, and AS 50 have been set up as NEs 34 that provide accounting messages. The CDF cluster 52 provides geo-redundancy according to the failover process. However, the IMS NEs 34 will ensure all Rf messages 42 in one call arrive in one CDF 54. All CDFs 54 are also connected to a CGF cluster 56 via a Ga interface 57 (e.g., general packet radio service (GPRS) tunneling protocol prime (GTP')) for redundancy. The CDF 54 will ensure all CDRs associated with a call are sent to one CGF 58. This arrangement allows for ease of CDR aggregation and correlation, since a CDF 54 or a CGF 58 does not need to poll other CDF 54 or CGF 58 to execute aggregation or correlation. The correlated CDR in a call is sent to the BS 60 via a Bx interface 62 (e.g., file transfer protocol (FTP) or secure FTP).

Correlation in the CCFs 40 is based on IMS charging identifiers (ICIDs). The ICID is generated by the first element 34 in an IMS network 36 that happens to be in the call signaling path. The call or session is understood to have finished when the serving CSCF (S-CSCF) 44 provides an indication to the CCFs 40 via sending an ACR [stop] with the corresponding ICID. This triggers further processing on the CCFs 40—aggregation, correlation and routing the generated CDR for the Bx interface 62.

It is common to see an AS 50 (e.g., telephony AS) involved in call processing. In this case, all call instances are sent from the S-CSCF 44 to the AS 50 for disposition and further processing. The AS 50 may in turn set up a second leg of the call, which is also known as an 'outbound call leg' in certain scenarios.

The apparatus and method for providing interim billing for an IMS session disclosed herein is based on: 1) using a standard attribute-value pair (AVP), such as Acct-Interim-Interval (AII) AVP; 2) taking the standard ACR of type 'interim' time limit; 3) introducing a partial CDR closing time value, 'T'; 4) using the reception of certain ACR[interim] time limit messages or the ACR[stop] message, whichever is earlier, from a select NE, for instance the AS, as the trigger for commencing LDC processing at the CCFs 40; and 5) using logic to handle the LDC mechanism based on parameters associated with the ACR[interim] time limit messages and the partial CDR closing time value.

The AII AVP is typically used as a heartbeat mechanism so that CCFs 40 can periodically get the CTF 38 to report on ongoing sessions. When a CTF 38 sends an accounting start message via ACR [start], the corresponding CCF 40 responds with an ACA and sets a value of the AII AVP (e.g., let us call it 't'). Under typical usage, 't' may be set to a value of 15 minutes. This implies that this CTF 38 should report back to the corresponding CCF 40 approximately every 15 minutes to let the corresponding CCF 40 know that the session is still alive. The CTF 38 does so via sending a periodic heartbeat via a time-based accounting interim message (e.g., ACR [interim] time limit). In case there is a change in the service, or additional media types are added or dropped, the CTF 38 also reports such occurrences via a media-based accounting interim message (e.g., ACR [interim] media change) that denotes a change in service or media. The two types of accounting interim messages (e.g., ACR [interim] time limit and ACR [interim] media change messages) can be distinguished from each other at the CCFs 40 by detecting specific AVPs in the corresponding accounting interim messages. For example, under Diameter base protocol, media-based accounting interim messages can be detected based on the presence of the optional Time Stamps AVP in the corresponding interim message because the Time Stamps AVP is not included in time-based accounting messages. In other embodiments, any AVP, parameter, or indicator in the interim message suitable for distinguishing between media-based and time-based interim messages may be utilized.

As defined in the standards (e.g., RFC 3588), the typical accounting interim message (e.g., ACR [interim]) consists of a few mandatory AVPs and a few optional AVPs. For an AS 50, a typical accounting interim message (e.g., ACR [interim]) includes mandatory parameters and optional parameters. For example, the mandatory parameters include: 1) Diameter Session Identifier (ID), 2) Origin Host, 3) Origin-Realm, 4) Destination Realm, 5) Accounting Record Type (INTERIM_RECORD), and 6) Accounting Record Number. The optional parameters, for example, may include: 1) Vendor Specific Application ID, 2) Acct-Interim Interval, 3) Origin State ID, 4) Event Time Stamp, 5) Event Type, 6) Role of Node, 7) User Session ID, 8) Calling Party Address, 9) Called Party Address, 10) Time Stamps, 11) Inter Operator ID, 12) ICID, 13) Session Description Protocol (SDP) Session Description, 14) SDP Media Component, 15) Gateway General Packet Radio System (GPRS) Support Node (GGSN) Address, 16) User-to-user Signaling (UUS) Data, and 17) System-Local-Time-Offset.

The purpose of introducing the partial CDR closing time value T is to demarcate the LDC processing in terms of the interim interval (i.e., t). This results in a caveat that the partial CDR closing time value T is a multiple of the interim interval. This is expressed in the following equation: $T = n \times t$, where n is an integer value $>= 1$.

As stated earlier, basing the trigger on the reception of select time-based accounting interim messages (e.g., ACR [interim] time limit) or the accounting stop message (e.g., ACR [stop]) ensures that all the calls can be addressed via this mechanism. Then, for each LDC, as specified in the standards, the ACRs would consist of: i) one accounting start message, ii) zero, one, or more time-based accounting interim messages, and iii) one accounting stop message.

While a short call or session may not have any time-based accounting interim message, given the typical duration of the "long duration" calls, it is expected that there would be several time-based accounting interim messages for such calls. For instance, if 't' is set to 15 minutes, a two hour call would have the CTF generate eight time-based accounting interim messages, each message at 15 minute intervals. A vast majority of closures for IMS sessions are expected to be signaled by an accounting stop message before any time-based accounting interim message is encountered. For example, 85-90 percent of IMS sessions may close without needing LDC processing. Conversely, roughly 10-15 percent of IMS sessions are expected to require LDC processing in a typical network.

The various embodiments disclosed herein use a mandatory parameter from the time-based accounting interim message (e.g., ACR [interim] time limit), namely, the Accounting Record Number parameter. Per definition, the mandatory parameters are required to be present in the time-based accounting interim message (e.g., ACR [interim] time limit) when the sending entities (e.g., CTF 38) construct the message to send to the corresponding CCF 40.

The various embodiments disclosed herein include processing logic for handling LDCs by defining 'T' to be a multiple of 't', parsing the incoming time-based accounting interim messages and triggering aggregation and correlation when the corresponding receiving CCF determines 'T' time has arrived based on information received in the time-based interim accounting message.

The various embodiments disclosed herein are resilient to handle CCF server failures or CCF overload conditions because the additional processing associated with individual timer maintenance in some previous interim billing process is removed. In addition, the logic uses "Time Limit" as the "Cause for record closing" for partial session CDRs. For the end-of-session CDR, the "Cause for record closing" would show up as normal termination, which would be the case when the call or session terminates normally on its own.

In an exemplary embodiment, the AII time interval 't' is set to 15 minutes. Assume also that the LDC partial CDR closing time value 'T' is set to 2 H. For a call that lasts more than 'T' hours: A) the CTF 38 would send a time-based accounting interim message (e.g., ACR [interim] time limit) at 15 minute intervals, B) the corresponding CCF 40 would assess if 'T' time has elapsed, based on the contents of the time-based accounting interim message (e.g., ACR [interim] time limit) and would induce generation of aggregation and correlation every 2 H, and C) steps A) and B) would continue until the call ends, in which case the end of session would kick off the second aggregation and correlation upon receipt of an accounting stop message (e.g., ACR [stop]) from the AS 50.

The CDR sent to the BS 60 in step B) would include a <<long call>> indicator to let the BS 60 know that additional CDRs are expected for the call. The CDR sent in step C) would include an <<end of long call>> indicator to the BS 60. Since both the CDRs would carry the same ICID (which does not change for the entire session duration), the BS 60 can combine these two CDRs, if necessary and appropriate. Note that if CDR1 and CDR2 in steps B) and C) are sent right on the billing closure boundary, CDR1 would show up in the current billing cycle and CDR2 would show up in the subsequent billing cycle. The BS 60 would, however, need to consult the entire call duration before rating and charging.

In an exemplary embodiment of a process for providing interim billing for an IMS session, assume two CTFs 38 and three CCFs 52. As before, the CTFs 38 are AS 50 and S-CSCF 44 and the CCFs 40 are named CCF1, CCF2 and CCF3. Further, as before, assume the AS 50 sends its ACRs to CCF1 and S-CSCF sends ACRs to CCF3 in the normal run.

Defining the value of 't' is done via setting up the value of the AII AVP. For example, the value of AII is set by each CCF 40 to 15 minutes. This value is sent to the CTF 38 in response to an accounting start message (e.g., ACR [start]). A network-wide value of 'T' is defined by the network operator (e.g., IMS service provider). The CCFs 40 are set up (i.e., configured) to a uniform 'T' value (e.g., 6 H) desired by the network operator. This means that the CCFs 40 produce an aggregated and correlated CDR for the partial session every 6 H.

For calls or sessions that last for a duration less than 't', assuming there are no service or media changes, the CCFs 40 would not expect to see any time-based accounting interim messages (e.g., ACR [interim] time limit). Such calls or sessions would typically show an accounting start message (e.g., ACR [start]) when the accounting begins and an accounting stop message (e.g., ACR [stop]) when the accounting ends. Under this scenario, the triggering of aggregation and correlation is based on the reception of the accounting stop message (e.g., ACR [stop]) from the AS 50.

For calls or session that last for more than 't' but less than 'T', one or more time-based accounting interim messages (e.g., ACR [interim] time limit) are sent from each CTF 38 to the corresponding CCF 40. Like the above scenario, under this scenario, aggregation and correlation is predicated upon the reception of the accounting stop message (e.g., ACR [stop]). Thus, again, the triggering of aggregation and correlation is based on the reception of the accounting stop message (e.g., ACR [stop]) from the AS 50.

For calls or session that last for more than 'T', one or more LDC-induced aggregation and correlation are expected. Under this scenario, the commencement of aggregation and correlation processing is based on the reception of the time-based accounting interim message (e.g., ACR [interim] time limit) from the AS 50. The description of the processing logic below elaborates on this scenario further.

In an exemplary embodiment of process logic for providing interim billing for an IMS session, a configurable timer 't' is supported in the CCFs 40 to supervise the reception of the time-based accounting interim message (e.g., ACR [interim] time limit) and/or the accounting stop message (e.g., ACR [stop]). An instance of the configurable timer 't' is started at the beginning of each accounting session, reset on receipt of a time-based accounting interim message (e.g., ACR [interim] time limit), and stopped after reception of the accounting stop message (e.g., ACR [stop]). Upon expiration of the timer 't', the corresponding CCF 40 stops the accounting session with the appropriate error indication. The configurable timer 't' can ensure that zombie sessions are not left behind in the CCF databases.

For scenarios in which the call or session lasts for more than 't' and/or more than 'T', the processing logic examines the time-based accounting interim messages (e.g., ACR [interim] time limit) sent by the AS 50. For example, the processing logic may examine a mandatory AVP carried in the time-based accounting interim messages (e.g., ACR [interim] time limit) sent by the CTFs 48, such as the Accounting-Record-Number AVP (i.e., AVP code 485). The Accounting-Record-Number AVP is of type unsigned 32 and identifies the record within a session. In combination with the Session-Id AVP (which is globally unique), the Session-Id and Accounting-Record-Number AVPs provide a globally unique value. While conventionally the record type for EVENT_RECORD and START_RECORD is set to the value 0, the value of the first INTERIM_RECORD is set to 1, and the subsequent INTERIM_RECORD would have a monotonically increasing increment by 1. An ACR of type STOP_RECORD has a final value of one more than the last ACR_INTERIM's Accounting-Record-Number AVP content.

For each Accounting-Record-Number extracted for the record type INTERIM_RECORD, with the Node-Functionality AVP (AVP Code 862) showing an ENUM value of 6 (i.e., identifying it as an AS record), the processing logic determines if this time-based accounting interim message (e.g., ACR [interim] time limit) should be construed as a trigger for starting aggregation and correlation by evaluating the expression: (Accounting-Record-Number) Modulo (T/t).

If the result of the evaluation is zero, this signifies that the aggregation and correlation trigger has arrived and the corresponding CCF 40 should process the available records for this purpose. Otherwise, for non-zero evaluations, the corresponding CCF 40 should not consider the record as the trigger for the processing and continue to process the incoming ACRs as usual. All other error processing (e.g., non-receipt of periodic heartbeat as explained above, receiving a malformed ACR, etc.) should continue as before.

The embodiment described above for any of the scenarios in which the call or session lasts for more than 't' presumes that no media-based accounting interim messages are received during the call. Another embodiment handles scenarios in which at least one media-based accounting interim message and at least one time-based accounting interim message are received during the call. The processing logic examines the accounting interim messages (e.g., ACR [interim]) sent by the AS 50 to distinguish media-based accounting interim messages (e.g., ACR [interim] media change) from time-based accounting interim messages (e.g., ACR [interim] time limit). For example, the processing logic may examine an optional AVP carried in the accounting interim messages (e.g., ACR [interim]) sent by the CTFs 48, such as the Time Stamps AVP. The Time Stamps AVP is present in media-based accounting interim messages and not present in time-based accounting interim messages. If a media-based accounting interim message is received by the CCF 40, a media change count parameter is set to one and incremented by one for each subsequent media-based accounting interim message received by the CCF 40 during the IMS session. The media change count parameter is reset after the IMS session ends.

The media change count parameter value may be stored in a storage device at a central location within the charging system that is accessible to secondary and alternate CCFs 40 as well as the primary CCF 40. The media change count parameter value may also be stored locally within the primary CCF 40.

For each Accounting-Record-Number extracted for the record type INTERIM_RECORD, with the Node-Functionality AVP (AVP Code 862) showing an ENUM value of 6 (i.e., identifying it as an AS record) from a time-based accounting interim message, the processing logic determines if the value for the Accounting-Record-Number AVP should cause a trigger for starting aggregation and correlation by evaluating the expression: (Accounting-Record-Number−Media Change Count) Modulo (T/t). If the result is zero, this signifies that the aggregation and correlation trigger has arrived and the corresponding CCF 40 should process the available records for this purpose. Otherwise, for non-zero evaluations, the corresponding CCF 40 should not consider the record as the trigger for the processing and continue to process the incoming ACRs as usual. All other error processing (e.g., non-receipt of periodic heartbeat as explained above, receiving a malformed ACR, etc.) should continue as before.

Figure 4:
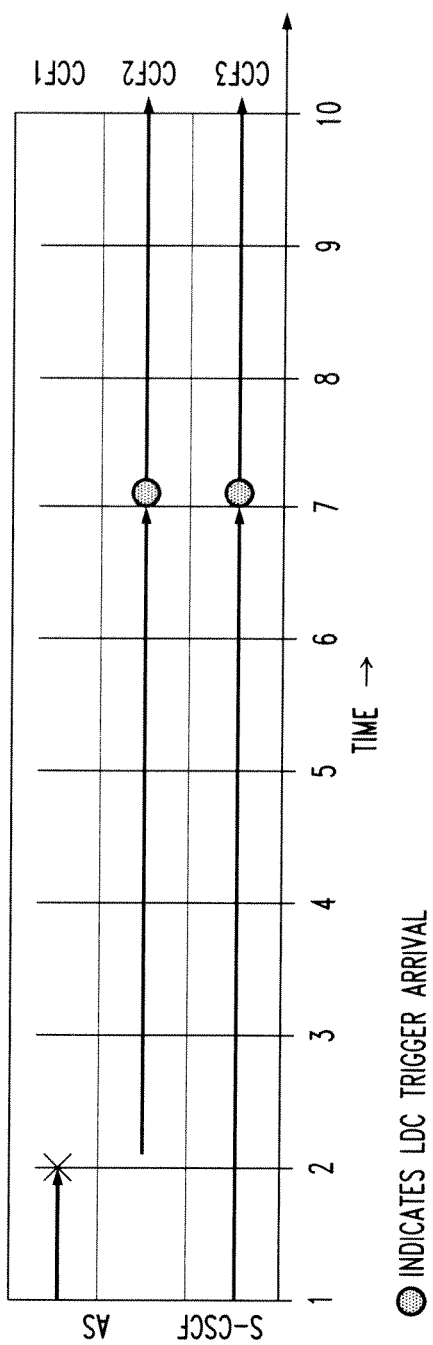
FIG. 4 is a timing diagram for an exemplary embodiment of a charging system that shows synchronized generation of partial CDRs in view of a CCF failure.

With reference to FIG. 4, using the processing logic described above, the problem of server switch-over caused by overload or OOS server can be managed as described in the following exemplary scenario. Upon a session start at 1 H, CCF1 and CCF3 start getting the ACRs from AS and S-CSCF, respectively. The CCFs have a common value established for the LDC, such as 6 H. For each time-based accounting interim message (e.g., ACR [interim] time limit) received from the CTFs, but AS in particular, the receiving CCF would evaluate the expression (Accounting-Record-Number) Modulo (T/t) or (Accounting-Record-Number−Media Change Count) Modulo (T/t) depending on whether a media-based accounting interim message is encountered. If CCF1 fails at 2 H, in the worst case, AS gets no ACA for its ACR driven by the AII time interval for two to three successive attempts. The AS executes a failover to CCF2 and gets the first ACR at, for example, 2:20 with a timestamp of 2:05.

At 7 H, the expression (Accounting-Record-Number) Modulo (T/t) or (Accounting-Record-Number−Media Change Count) Modulo (T/t), depending on whether a media-based accounting interim message is encountered, evaluates to zero, indicating that the trigger has arrived to initiate aggregation and correlation. CCF2 and CCF3 carry out the aggregation, then determine the correlation host for the session as f(ICID). Assuming CCF2 is the correlation host, as determined by f(ICID), CCF3 would send the aggregated record from the S-CSCF to the CCF2 for correlation. CCF2 would correlate the aggregated AS record with that of the aggregated S-CSCF record (received from CCF3) and send the record to the billing mediation system. For additional information on this distributed correlation processing refer to PCT Patent Application No. PCT/US2009/040197, filed Apr. 10, 2009, the entire contents of which are incorporated herein by reference. This processing continues until the session ends.

With continued reference to FIG. 4, the CCFs do not need to maintain any timers locally for triggering LDC processing, which includes time-based aggregation and correlation. Moreover, the exemplary process and exemplary processing logic described herein is server-failure and server-overload tolerant. As shown in the example above, a session can be handed off to another CCF in mid-session without any loss of continuity and without LDC processing going out of sync. Moreover, the exemplary process and exemplary processing logic is resilient to additional (e.g., second, third, etc.) failures of servers as well. For example, if CCF2 or CCF3 were to fail after the failure of CCF1, which would be a tandem failure, the remaining server (or servers) can still handle the LDC processing, subject to available capacity and network load. This is possible because the CCFs do not individually time the LDC processing. Rather, timing for the LDC processing is derived from the reception of time-based accounting interim messages (e.g., ACR [interim] time limit). The loss of a time-based accounting interim message (e.g., ACR [interim] time limit) for any reason can likewise be tolerated. For example, if CCF1 gets a time-based accounting interim message (e.g., ACR [interim] time limit) and goes OOS soon afterwards, the time-based accounting interim message (e.g., ACR [interim] time limit) would probably go unaccounted until CCF1 is in-service (IS) again. However, the sending CTF would seek an alternate peer (e.g., another CCF server) while CCF1 is OOS and would continue sending ACR messages to the alternate peer. The alternate peer can determine if a session-specific aggregation/correlation trigger has arrived using the processing logic described above.

In summary, the exemplary process and exemplary processing logic described herein: i) includes determination of an LDC trigger based on contents of a time-based accounting interim message in conjunction with an operator-provisioned network-wide LDC partial CDR closing time value; ii) provides reduced processing requirements on the CCF servers and consequently higher throughput, iii) operates independent of clock-skew on the CCFs, iv) operates independent of the network congestion/delays in sending ACRs to the CCF, and v) provides single and multiple server fault tolerant.

Similarly, the exemplary process and exemplary processing logic disclosed herein provide the following benefits: i) single and multiple fault-resilience while processing LDC, ii) not needing to instantiate a timer for the LDC processing on the CCF servers which reduces processing overheads on the CCF servers and thereby increases throughput, iii) higher performance via circumventing "trigger distribution," iv) works well with the distributed correlation processing, v) independent of the network-delays in sending messages to the CCF, and vi) does not require time coordination and synchronization of clocks across the CCF servers. For example, the exemplary process and exemplary processing logic disclosed herein may improve CCF performance by five to seven percent over certain previous systems by eliminating timer maintenance required on a per-session basis by some previous interim billing processes. Moreover, LTE and eHRPD pose a large processing challenge on the CCFs because flow-based bearer charging requirements are a CPU-intensive activities which require large number of servers to be deployed. Thus, any method of optimization of the processing is very beneficial to network operations.

Figure 6:
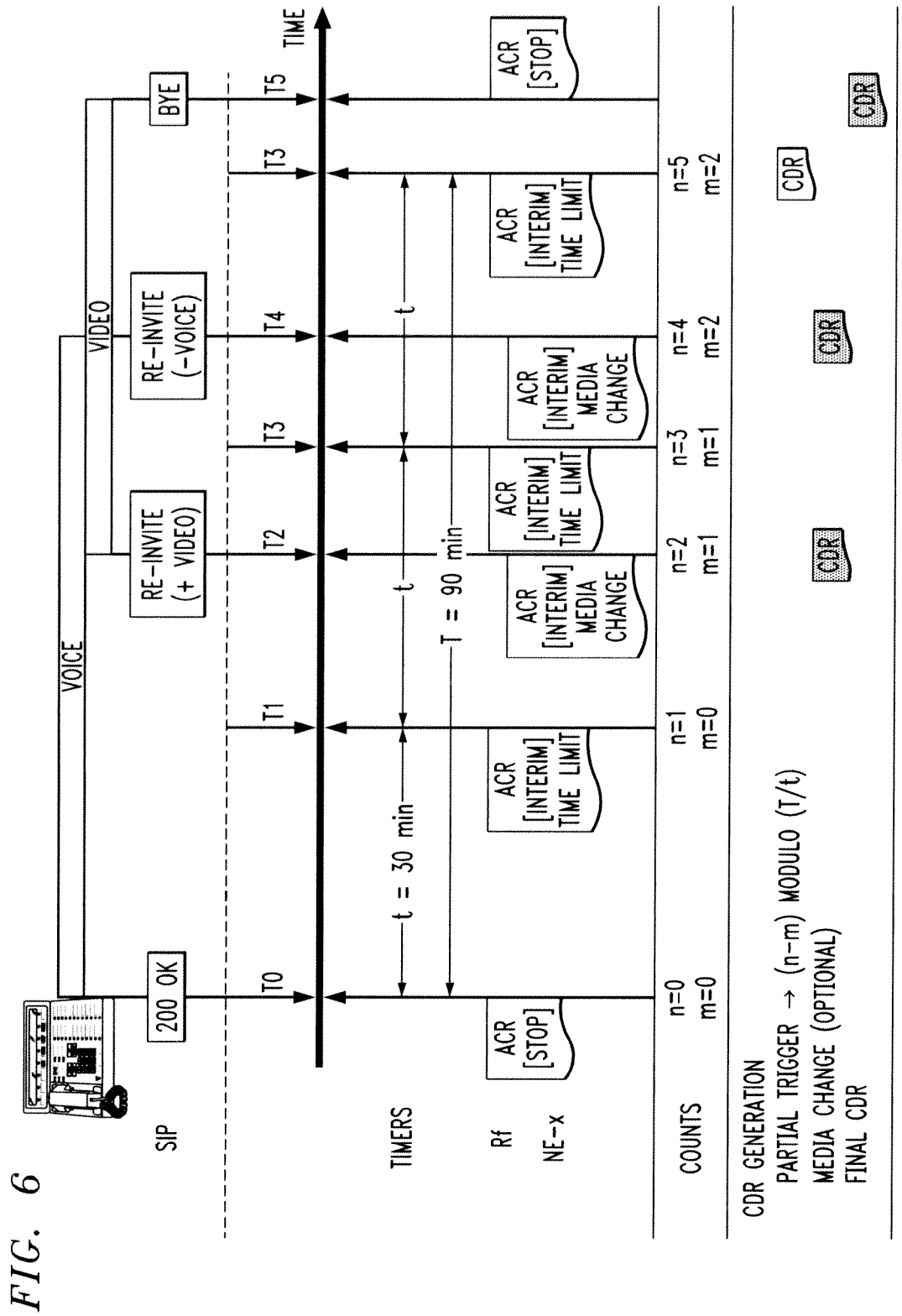
FIG. 6 is a timing diagram of another exemplary embodiment of a charging system that shows media changes during an IMS session and corresponding messaging and partial CDR generation.

With reference to FIG. 6, a timing diagram of an exemplary embodiment of a charging system shows the effect of media changes on accounting messaging to the charging system during an IMS session and partial CDR generation associated with the media changes. There are two types of ACR[interim] messages: 1) ACR[interim] messages (time-based or time limit) generated by the CTF for which the periodically period is defined by either a local NE configured time or by the CDF through Acct-Accounting-Interval AVP of the ACA message and 2) ACR[interim] messages (media-based or media change) generated by CTF at media modification (driven by SIP signalling). The time-based ACR[interim] messages can be used for triggering the periodic partial CDRs because the time between two consecutive messages of this type is fixed (i.e. t). Media-based ACR[interim] messages received by the CDF should not be taken into account for triggering partial CDRs. The Accounting-Record-Number in ACR[interim]

messages is incremented for both ACR[interim] types. Hence, the Accounting-Record-Number may be adapted before it is used as base for the triggering of partial CDRs in conjunction with the LDC time (T). This can be accomplished by different methods. For example, one option is to "adjust" the Accounting-Record-Number (N) by subtracting the number of media-change driven ACR[interim] (m) from N. This option may save the value of "m" and "N" in a data store from which the current values can be retrieved by the alternative CDFs (or secondary CDFs) after failure of the primary CDF. Central storage of N and m comes with a small performance cost, but because the store action is only required at receipt of the first ACR[interim] message (in most cases after t), its impact is very low.

Figure 15:
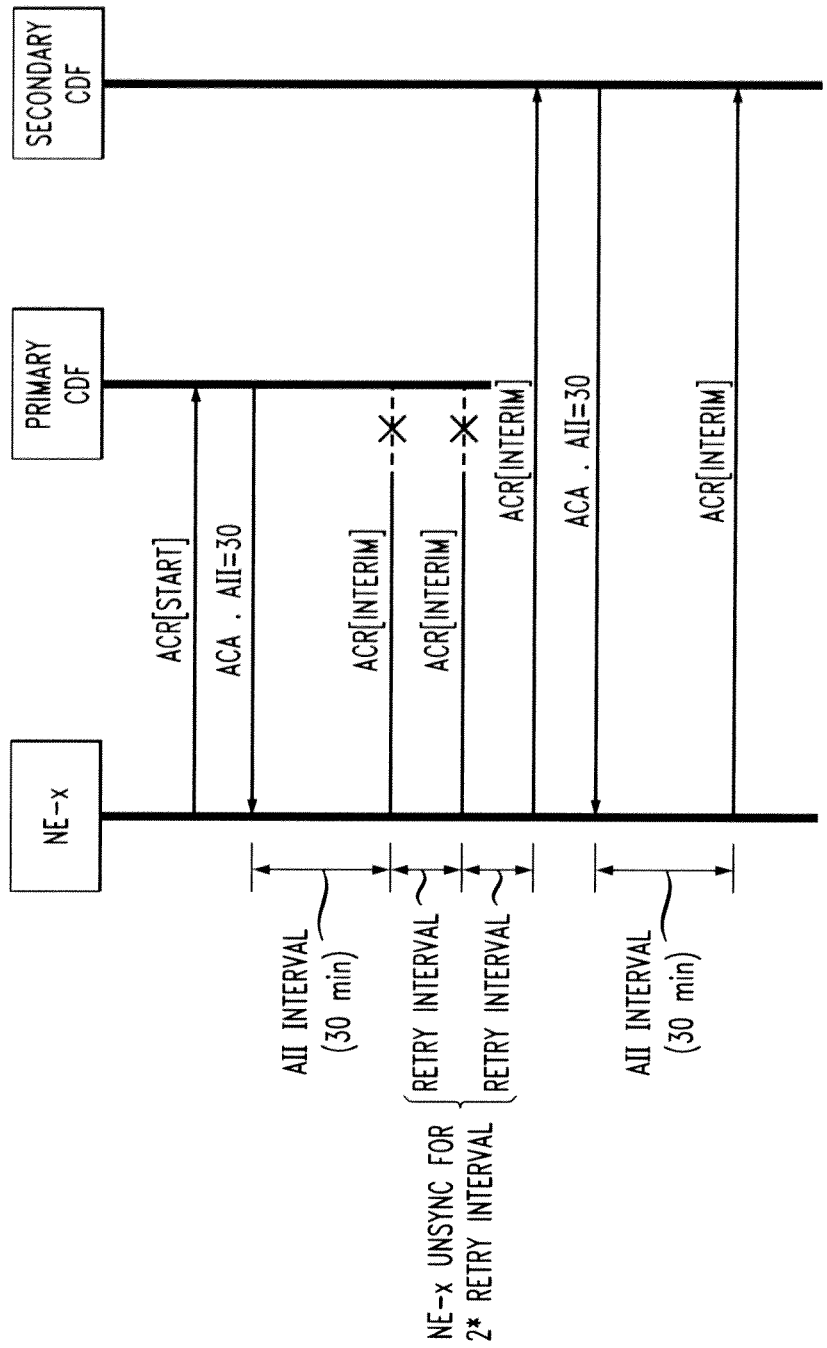
FIG. 15 is a timing diagram of another exemplary embodiment of a charging system that shows a failover operation by an NE from a primary CDF to a secondary CDF during an IMS session and corresponding messaging.

With reference to FIG. 15, a timing diagram of another exemplary embodiment of a charging system shows a failover operation by an NE from a primary CDF to a secondary CDF during an IMS session and the corresponding accounting messaging. After switch-over from Primary to Secondary CDF, the AII is "drifting" from its initial phase (t*n). A concern here is that T is not exactly t*n after switchover. For example, the retry interval is typically not higher than 5 seconds. When the tolerance for drifting of synchronisation across different ACR streams is fairly high, there is no issue. However, it may be beneficial to apply an adjustment with every switch-over. This issue can be resolved in different ways. One option is to adjust AII (consequently t) once after a switch-over. Depending on the implementation, a fixed adjustment can be applied (e.g. 10 seconds). Another solution option is to save the time of a timer driven ACR[interim] in a central storage device. After switch-over, the secondary CDF may retrieve the timestamp of the previous timer driven ACR [interim] and adjust the AII accordingly. Note that in both cases there is information to sync between CDFs (a primary and x secondary nodes). However, synchronisation is only required for LDC calls (i.e., calls for which the duration exceeds t). Therefore the overhead as a consequence of this method can be neglected. The point addressed by this feature is that the next ACR[interim] trigger may be delayed with the time it took to retry the previous interim message due to the failover operation. When a CDF receives an ACR, it must acknowledge the ACR with an ACA message that contains AII, i.e. delay time t (t is typically a provisioned value at the CDF). When the NE receives an ACA it is supposed to use the included AII to send the next periodic ACR[interim].

Figure 22:
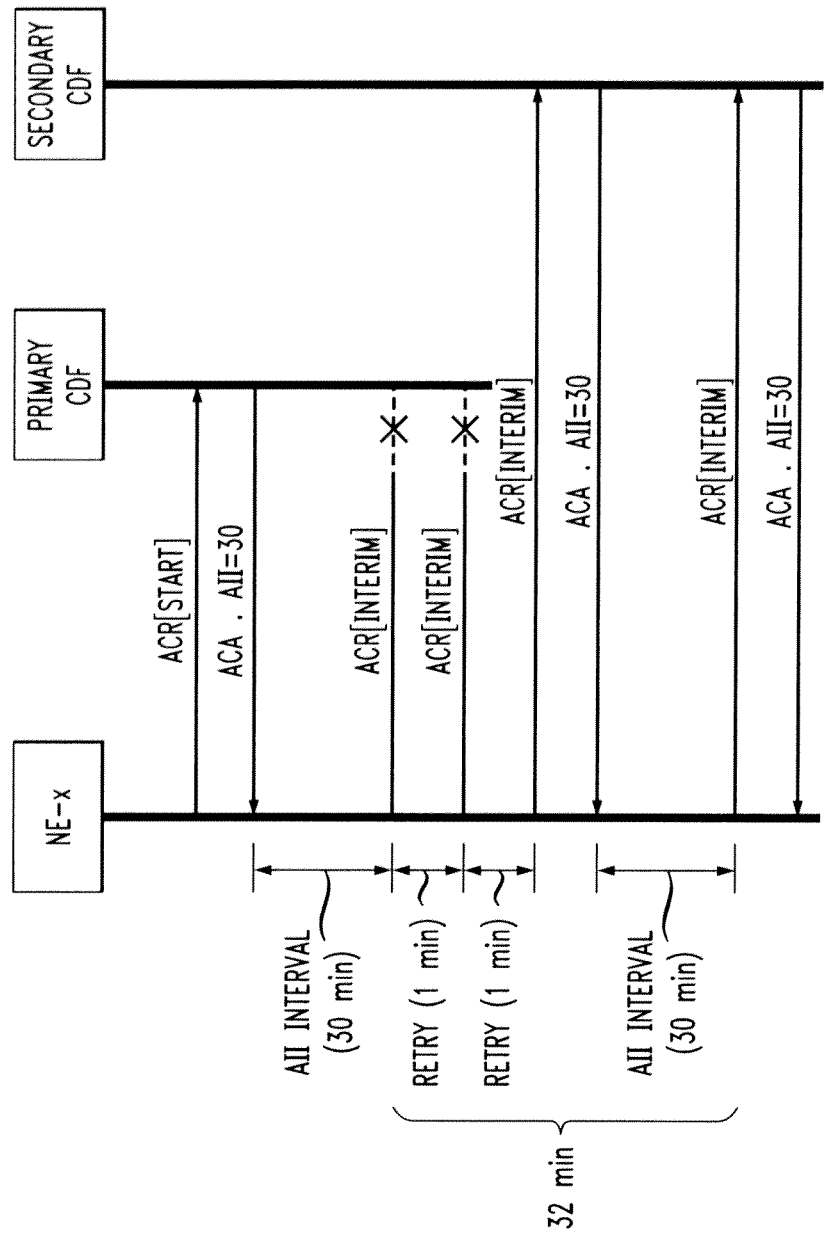
FIG. 22 is a timing diagram of yet another exemplary embodiment of a charging system that shows a failover operation by an NE from a primary CDF to a secondary CDF during an IMS session and corresponding messaging and the offset in time-based interim accounting messages due to the failover operation.

With reference to FIG. 22, a timing diagram of yet another exemplary embodiment of a charging system shows a failover operation by an NE from a primary CDF to a secondary CDF during an IMS session and accounting messaging associated with offset in time-based interim accounting messages due to the failover operation. As shown, when the primary CDF failed, the NE will retry to send the ACR[interim] to that CDF. Suppose the NE retries two times with intervals of 1 minute (1 minute is simply used as a simple example to emphasize the problem, normally the retry delay is in seconds). After 2 retries (e.g., 2 minutes), the NE will redirect the ACR to a secondary CDF. In case the secondary CDF inserts a fixed AII in the ACA with value 30 minutes, then the elapsed time between this (redirected) ACR and the next ACR will be 32 minutes. This may result in undesirable consequences for the partial CDR trigger. Particularly, when T=t*3 because the time between the corresponding two partial CDRs will be 30+32+30=92.

Figure 23:
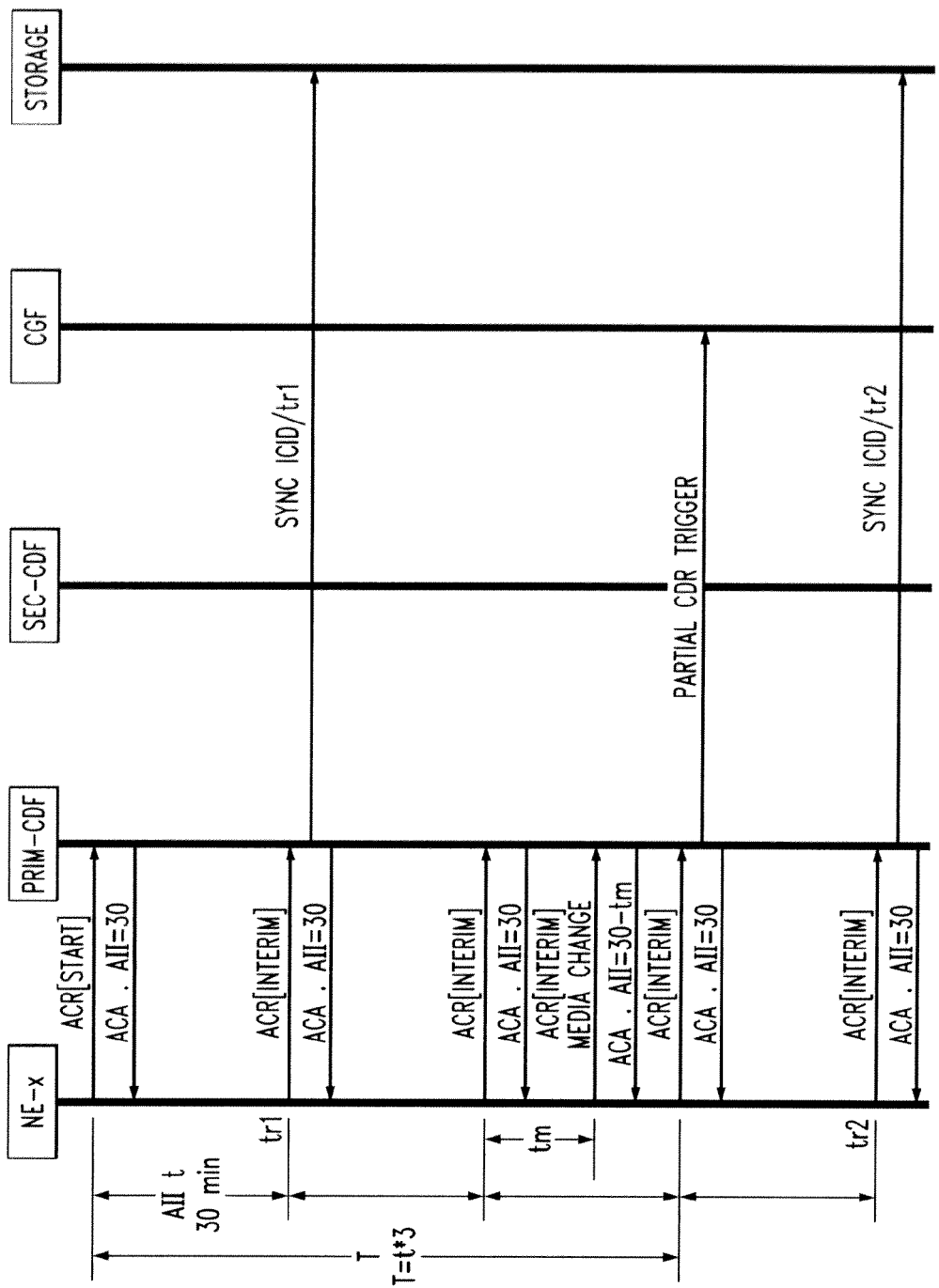
FIG. 23 is a timing diagram of still another exemplary embodiment of a charging system that shows a media change during an IMS session without a failover operation and corresponding messaging and partial CDR trigger generation using a time stamp feature.

With reference to FIG. 23, a timing diagram of still another exemplary embodiment of a charging system shows the effect of media changes on accounting messaging to the charging system during an IMS session without a failover operation and partial CDR trigger generation using a time stamp feature in view of the media changes. Another possible solution to facilitate time-based interim billing is to save a reference time stamp that can be retrieved by any secondary CDF after switchover to allow the new CDF to "sync" on the correct "t" phase. For example, a logical reference timestamp would be the time of the first time driven ACR[interim] accounting message of every period T. FIG. 23 shows a first scenario shows with the "sunny day" case. The (primary) CDF stores the reference timestamp on the central storage device. Note that treatment of a media-change driven ACR[interim] is also included.

Figure 24:
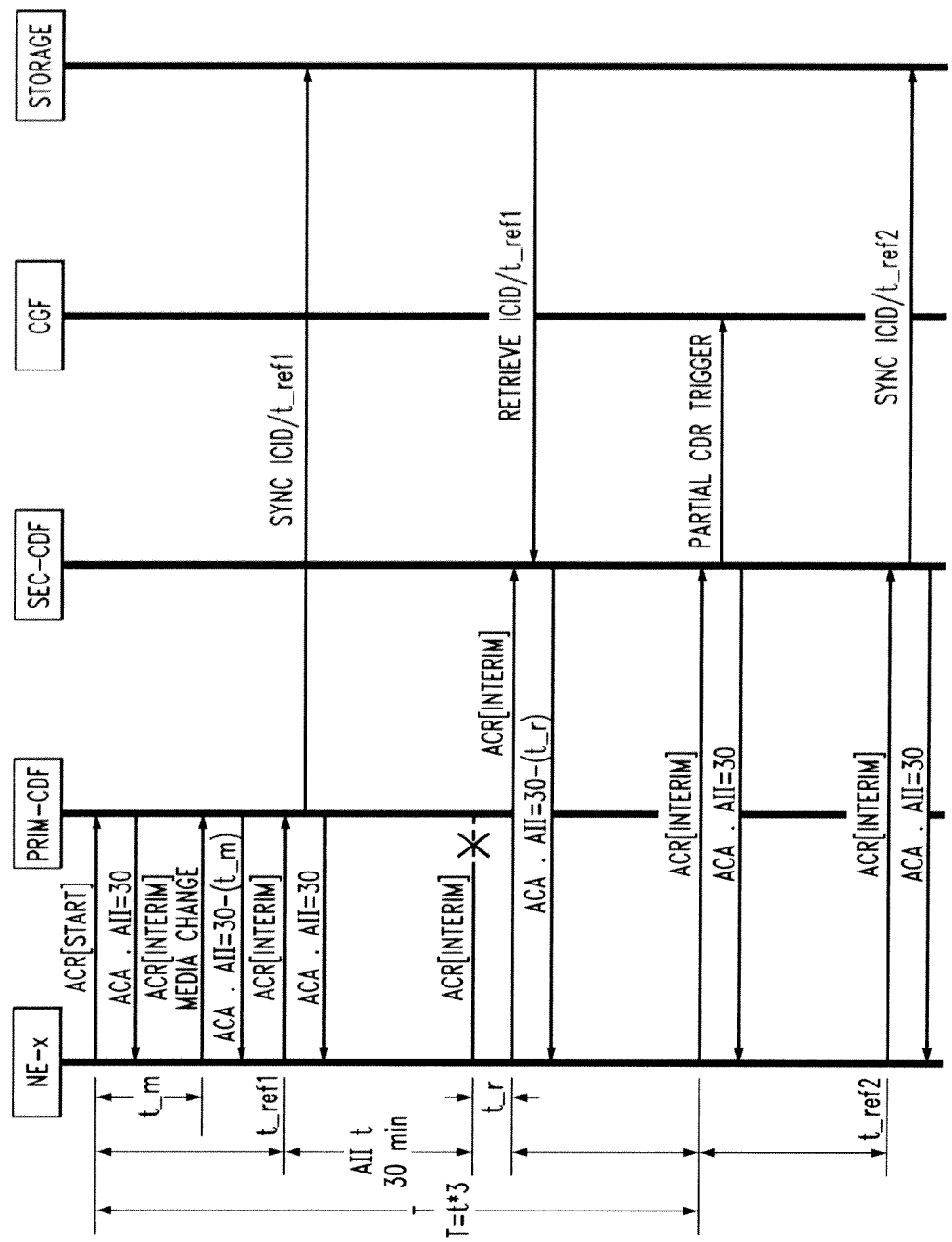
FIG. 24 is a timing diagram of still yet another exemplary embodiment of a charging system that shows a media change during and a failover operation by an NE from a primary CDF to a secondary CDF during an IMS session and corresponding messaging to temporarily offset timing of time-based interim accounting messages to compensate for the failover operation as well as partial CDR trigger generation using a time stamp feature.

With reference to FIG. 24, a timing diagram of still yet another exemplary embodiment of a charging system shows the effect of a media change on accounting messaging to the charging system during an IMS session with a failover operation by an NE from a primary CDF to a secondary CDF with partial CDR trigger generation in view of the media change and corresponding messaging to temporarily offset timing of time-based interim accounting messages to compensate for the failover operation. FIG. 24 shows a second scenario with the corresponding recovery case in view of a failover operation.

Figure 5:
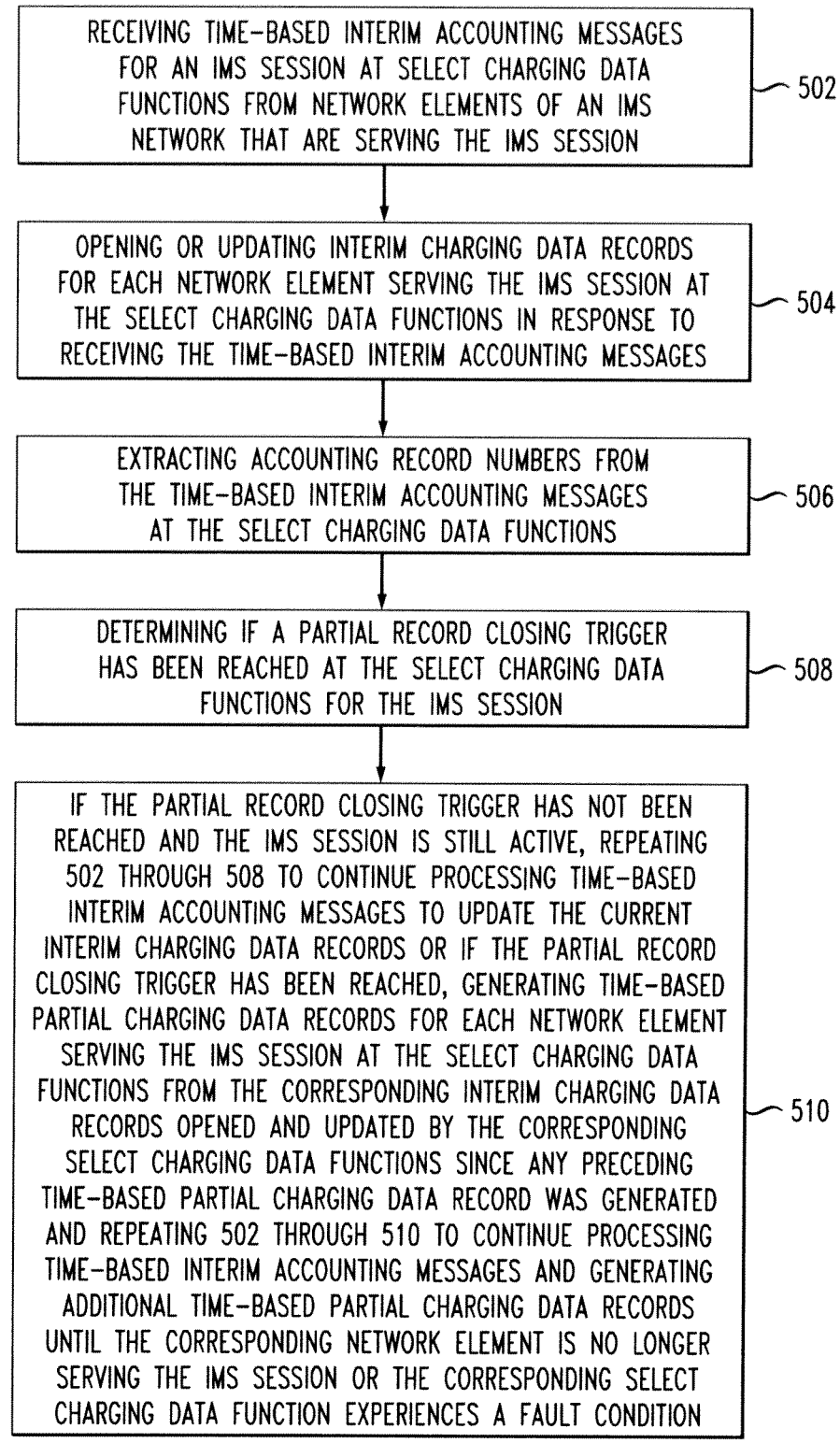
FIG. 5 is a flow chart of an exemplary embodiment of a process for facilitating interim billing for an IMS session.

With reference to FIG. 5, an exemplary embodiment of a process 500 for facilitating interim billing for an IMS session begins at 502 where time-based interim accounting messages for an IMS session are received at select CDFs from NEs of an IMS network that are serving the IMS session. The CDFs may include any suitable combination of servers, network nodes, and other types of network devices. Likewise, the CCF may include any suitable combination of servers, network nodes, and other types of network devices. Next, interim CDRs are either opened or updated for each NE serving the IMS session at the select CDFs in response to receiving the time-based interim accounting messages (504). The interim CDRs may be stored in any suitable storage device. The interim CDRs may be stored locally or in a central location. At 506, accounting record numbers are extracted from the time-based interim accounting messages at the select CDFs. The accounting record numbers uniquely identifying the corresponding time-based interim accounting message in relation to other interim accounting messages from the corresponding NE for the IMS session. Next, the process 500 determines if a partial record closing trigger has been reached at the select CDFs for the IMS session (508). The partial record closing trigger may be a function of the corresponding accounting record number extracted in 506, an AII value accessible to the select CDFs, and a partial record closing threshold accessible to the select CDFs. The partial record closing trigger function may include any suitable expression of the accounting record number, AII value, and partial record closing threshold. The accounting record number, AII value, and partial record closing threshold may be stored in any suitable storage device. The accounting record number, AII value, and partial record closing threshold may be stored locally or in a central location.

At 510, if the partial record closing trigger has not been reached and the IMS session is still active, the process 500 repeats 502 through 508 to continue processing time-based interim accounting messages to update current interim CDRs. Conversely, if the partial record closing trigger has been reached, time-based partial CDRs are generated for each NE serving the IMS session at the select CDFs from the corresponding interim CDRs opened and updated by the corresponding select CDFs since any preceding time-based partial CDR was generated and 502 through 510 are repeated to continue processing time-based interim accounting messages and generating additional time-based partial CDRs until the corresponding NE is no longer serving the IMS session or the corresponding select CDF experiences a fault condition. The time-based partial CDRs may be stored in any suitable storage device. The time-based partial CDRs may be stored locally or in a central location.

In another embodiment, the process 500 may also include, from at least one select CDF, incrementing a media change count for the corresponding NE in relation to the IMS session by one in response to receiving each of one or more media-based interim accounting message from the corresponding NE during the IMS session. The media change count may be stored in a storage device accessible to the corresponding select CDF. The media change count may be stored in any suitable storage device. The media change count may be stored locally or in a central location. At each corresponding select CDF, the corresponding media change count may be retrieved from the storage device in conjunction with the determining in 508. The partial record closing trigger in 508 may also be a function of the corresponding media change count retrieved from the storage device.

In a further embodiment of the process 500, an expression for the partial record closing trigger in 508 comprises (N−m) Modulo (T/t), where N is the accounting record number, m is the corresponding media change count, T is the partial record closing threshold, and t is the AII value. The partial record closing trigger has been reached when the expression is equal to zero.

In yet another embodiment, the process 500 may also include, for at least one select CDF, extracting a first event time stamp from the time-based interim accounting message associated with updating the interim CDR in 504 during a first repetition of 502 through 510. From each corresponding select CDF, the first event time stamp may be stored in a storage device accessible to the corresponding select CDF. The first event time stamp may be stored in any suitable storage device. The first event time stamp may be stored locally or in a central location. At each corresponding select CDF, a second event time stamp may be extracted from the time-based interim accounting message associated with the updating in 504 during a subsequent repetition of 502 through 510. At each corresponding select CDF, the first event time stamp may be retrieved from storage in conjunction with the determining in 508 during the subsequent repetition of 502 through 510. For each corresponding select CDF, the process 500 may repeat extracting the second event time stamp and retrieving the first event time stamp until determining the interim process trigger for the IMS session has been reached. After determining the interim process trigger for the IMS session has been reached, the process 500 may repeat extracting and storing the first event time stamp as well as extracting the second event time stamp and retrieving the first event time stamp. The partial record closing trigger in 508 may also be a function of the first event time stamp retrieved from storage, the second event time stamp extracted from the time-based interim accounting message, and an interim processing tolerance accessible to the corresponding select CDF. The interim processing tolerance may be stored in any suitable storage device. The interim processing tolerance may be stored locally or in a central location. An expression shows the partial record closing trigger is reached when a difference between the second event time stamp and a start event time stamp for an interim processing cycle are within the interim processing tolerance of the partial record closing threshold. The start event time stamp is the first event time stamp less the AII value.

With reference to FIGS. 5 and 7, yet another exemplary embodiment of a process 700 for facilitating interim billing for an IMS session continues from 510 with 702 where each select CDF aggregates the time-based partial CDRs generated in a given occurrence of 510 by the corresponding CDF with any other partial CDRs associated with the corresponding NE that were generated by the corresponding CDF during the IMS session and not previously aggregated to form aggregated partial CDRs for each NE serving the IMS session in conjunction with each repetition of determining the partial record closing trigger has been reached in 508. The aggregated partial CDRs may be stored in any suitable storage device. The aggregated partial CDRs may be stored locally or in a central location.

With reference to FIGS. 5, 7, and 8, yet another exemplary embodiment of a process 800 for facilitating interim billing for an IMS session continues from 702 with 802 where each of one or more CGFs correlate aggregated partial CDRs formed in 702 to form a consolidated partial CDR for the IMS session relating to each CGF. The CGFs may include any suitable combination of servers, network nodes, and other types of network devices. CGFs may be combined or co-located with CDFs in any suitable combination of servers, network nodes, and other types of network devices. The consolidated partial CDRs may be stored in any suitable storage device. The consolidated partial CDRs may be stored locally or in a central location. Next, each consolidated partial CDR may be transferred from the corresponding CGF to a BS to facilitate interim billing of the IMS session in conjunction with each repetition of determining the partial record closing trigger has been reached in 508 (804).

Figure 9:
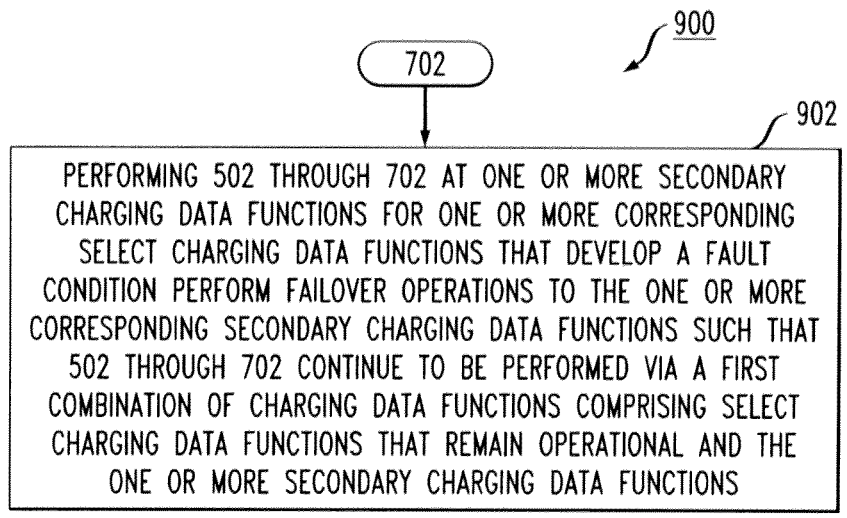
FIG. 9, in conjunction with FIGS. 5 and 7, is a flow chart of still yet another exemplary embodiment of a process for facilitating interim billing for an IMS session.
Figure 10:
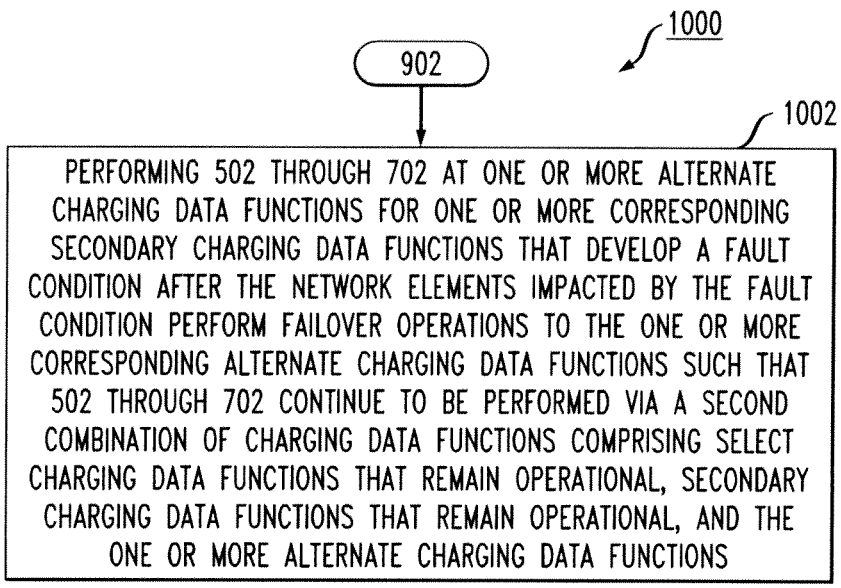
FIG. 10, in conjunction with FIGS. 5 and 7 and 9, is a flow chart of another exemplary embodiment of a process for facilitating interim billing for an IMS session.

With reference to FIGS. 5, 7, and 9, still another exemplary embodiment of a process 900 for facilitating interim billing for an IMS session continues from 702 with 902 where 502 through 702 are performed at one or more secondary CDFs for one or more corresponding select CDFs that develop a fault condition after the NEs impacted by the fault condition perform failover operations to the one or more corresponding secondary CDFs such that 502 through 702 continue to be performed via a first combination of CDFs comprising select CDFs that remain operational and the one or more secondary CDFs. The secondary CDFs may include any suitable combination of servers, network nodes, and other types of network devices. Secondary CDFs may be combined or co-located with other CDFs in any suitable combination of servers, network nodes, and other types of network devices. The generating in 510 and the aggregating in 702 in conjunction with each repetition of determining the partial record closing trigger has been reached in 508 continue in time relation for the first combination of CDFs. In another embodiment, the process 900 may also include, from at least one select CDF with the fault condition, incrementing a media change count for the corresponding NE in relation to the IMS session by one in response to receiving each of one or more media-based interim accounting message from the corresponding NE during one or more primary repetitions of 502 through 510. The media change count being stored in a storage device accessible to the corresponding select CDF with the fault condition and the corresponding secondary CDF. The media change count may be stored in any suitable storage device. The media change count may be stored locally or in a central location. At each corresponding secondary CDF, the corresponding media change count may be retrieved from the storage device during each repetition of one or more secondary repetitions of 502 through 510 in conjunction with the determining in 508. The partial record closing trigger in 508 may also be a function of the corresponding media change count retrieved from the storage device.

In a further embodiment of the process 900, an expression for the partial record closing trigger in 508 comprises (N−m) Modulo (T/t), where N is the accounting record number, m is the corresponding media change count, T is the partial record closing threshold, and t is the AII value. The partial record closing trigger has been reached when the expression is equal to zero.

In yet another embodiment, the process 900 may also include, from each corresponding secondary CDF, incrementing the corresponding media change count by one in response to receiving each of one or more media-based interim accounting message from the corresponding NE during the one or more secondary repetitions of 502 through 510.

In still another embodiment, the process 900 may also include, for at least one select CDF with the fault condition, extracting a first event time stamp from the time-based interim accounting message associated with updating the corresponding interim CDR in 502 during a first primary repetition of one or more primary repetitions of 502 through 510. From each corresponding select CDF with the fault condition, the first event time stamp may be stored in a storage device accessible to the corresponding select CDF with the fault condition and the corresponding secondary CDF. The first event time stamp may be stored in any suitable storage device. The first event time stamp may be stored locally or in a central location. At each corresponding secondary CDF, a second event time stamp may be extracted from the time-based interim accounting message associated with the opening or updating in 502 during a secondary repetition of one or more secondary repetitions of 502 through 510. At each corresponding secondary CDF, the first event time stamp may be retrieved from the storage device in conjunction with the determining in 508 during the secondary repetition of the one or more secondary repetitions of 502 through 510. For each corresponding secondary CDF, the process 900 may repeat extracting the second event time stamp and retrieving the first event time stamp until determining the interim process trigger for the IMS session has been reached. After determining the interim process trigger has been reached, the process 900 may repeat extracting and storing the first event time stamp as well as extracting the second event time stamp and retrieving the first event time stamp. The partial record closing trigger in 508 may also be a function of the first event time stamp retrieved from storage, the second event time stamp extracted from the time-based interim accounting message, and an interim processing tolerance accessible to the corresponding secondary CDF. The interim processing tolerance may be stored in any suitable storage device. The interim processing tolerance may be stored locally or in a central location. An expression shows the partial record closing trigger is reached when a difference between the second event time stamp and a start event time stamp for an interim processing cycle are within the interim processing tolerance of the partial record closing threshold. The start event time stamp is the first event time stamp less the AII value.

In still yet another embodiment, the process 900 may also include, for at least one secondary CDF, extracting an initial second event time stamp from the time-based interim accounting message associated with opening an initial secondary interim CDR for the IMS session. At each corresponding secondary CDF, retrieving a first event time stamp from a storage device accessible to the primary and secondary CDFs in conjunction with the determining in 508 during the initial repetition of one or more secondary repetitions of 502 through 510. At each corresponding secondary CDF, determining the first event time stamp retrieved from storage is a null value and setting the first event time stamp to the initial second event time stamp extracted from the time-based interim accounting message. The partial record closing trigger in 508 may also be a function of the first event time stamp set by the secondary CDF, the initial second event time stamp extracted from the time-based interim accounting message, and an interim processing tolerance accessible to the secondary CDF. The interim processing tolerance may be stored in any suitable storage device. The interim processing tolerance may be stored locally or in a central location. An expression shows the partial record closing trigger is reached when a difference between the initial second event time stamp and a start event time stamp for an interim processing cycle are within the interim processing tolerance of the partial record closing threshold. The start event time stamp is the first event time stamp less the AII value.

In a further embodiment of the process 900, from each corresponding secondary CDF, the initial second event time stamp may be stored in the storage device to replace the null value with the first event time stamp. At each corresponding secondary CDF, a subsequent second event time stamp may be extracted from the time-based interim accounting message associated with updating the secondary interim CDR during a subsequent repetition of the one or more secondary repetitions of 502 through 510. At each corresponding secondary CDF, the first event time stamp may be retrieved from the storage device in conjunction with the determining in 508 during the subsequent repetition of the one or more secondary repetitions of 502 through 510. For each corresponding secondary CDF, the process 900 may repeat extracting the second event time stamp and retrieving the first event time stamp until determining the interim process trigger for the IMS session has been reached. The partial record closing trigger may also be a function of the subsequent second event time stamp extracted from the time-based interim accounting message. An expression shows the partial record closing trigger is reached when a difference between the subsequent second event time stamp and the start event time stamp for the interim processing cycle are within the interim processing tolerance of the partial record closing threshold.

In another embodiment, the process 900 may also include sending a first accounting answer from at least one secondary CDF to the corresponding NE with an AII parameter reduced from the AII value by a retry offset value accessible to the corresponding secondary CDF in response to receiving the time-based interim accounting message in 502 associated with opening a corresponding initial secondary interim CDR for the IMS session. The retry offset value may be stored in any suitable storage device. The retry offset value may be stored locally or in a central location. A second accounting answer may be sent from the corresponding secondary CDF to the corresponding NE with the AII parameter reset to the AII value in response to receiving the time-based interim accounting message associated with a first updating of the corresponding initial secondary interim charging record for the IMS session.

With reference to FIGS. 5, 7, 9, and 10, still yet another exemplary embodiment of a process 1000 for facilitating interim billing for an IMS session continues from 902 with 1002 where 502 through 510 are performed alternate CDFs for one or more corresponding secondary CDFs that develop a fault condition after the NEs impacted by the fault condition perform failover operations to the one or more corresponding alternated CDFs such that 502 through 702 continue to be performed via a second combination of CDFs comprising select CDFs that remain operational, secondary CDFs that remain operational, and the one or more alternate CDFs. The alternate CDFs may include any suitable combination of servers, network nodes, and other types of network devices. Alternate CDFs may be combined or co-located with other CDFs in any suitable combination of servers, network nodes, and other types of network devices. The generating in 510 and the aggregating in 702 in conjunction with each repetition of determining the partial record closing trigger has been reached in 508 continue in time relation for the second combination of CDFs.

With continuing reference to the various exemplary embodiments of the process (i.e., 500, 700, 800, 900, 1000) in FIGS. 5 and 7-10, in further embodiments, the AII value in the corresponding process may relate to transmission of time-based interim accounting messages between start and stop accounting messages by NEs for the IMS session and may indicate a time interval between each time-based interim accounting message and a preceding start or time-based interim accounting message, the time interval being selected by an IMS service provider for the IMS session. In other embodiments, the partial record closing threshold may define a time interval between generation of time-based partial CDRs for the IMS session, the time interval being selected by an IMS service provider for the IMS session.

In a further embodiment, the partial record closing threshold may be a positive integer multiple of the AII value. For example, the partial record closing threshold may be 6 H and the AII value may be 0.25 H. Similarly, the partial record threshold may evenly divide into a predetermined period of calendar time. For example, the partial record threshold may by 6 H and the predetermined period of calendar time may be 24 H.

In another further embodiment, the partial record closing threshold may a function of the AII value. For example, an expression of the partial record closing threshold function may comprise T=n*t, where T is the partial record closing threshold, n is an integer $\geq 1$, and t is the AII value. In yet another further embodiment, an expression of the partial record closing trigger function may comprise (N) Modulo (T/t), where N is the accounting record number, T is the partial record closing threshold, and t is the AII value. The partial record closing trigger has been reached when the expression is equal to zero.

Figure 11:
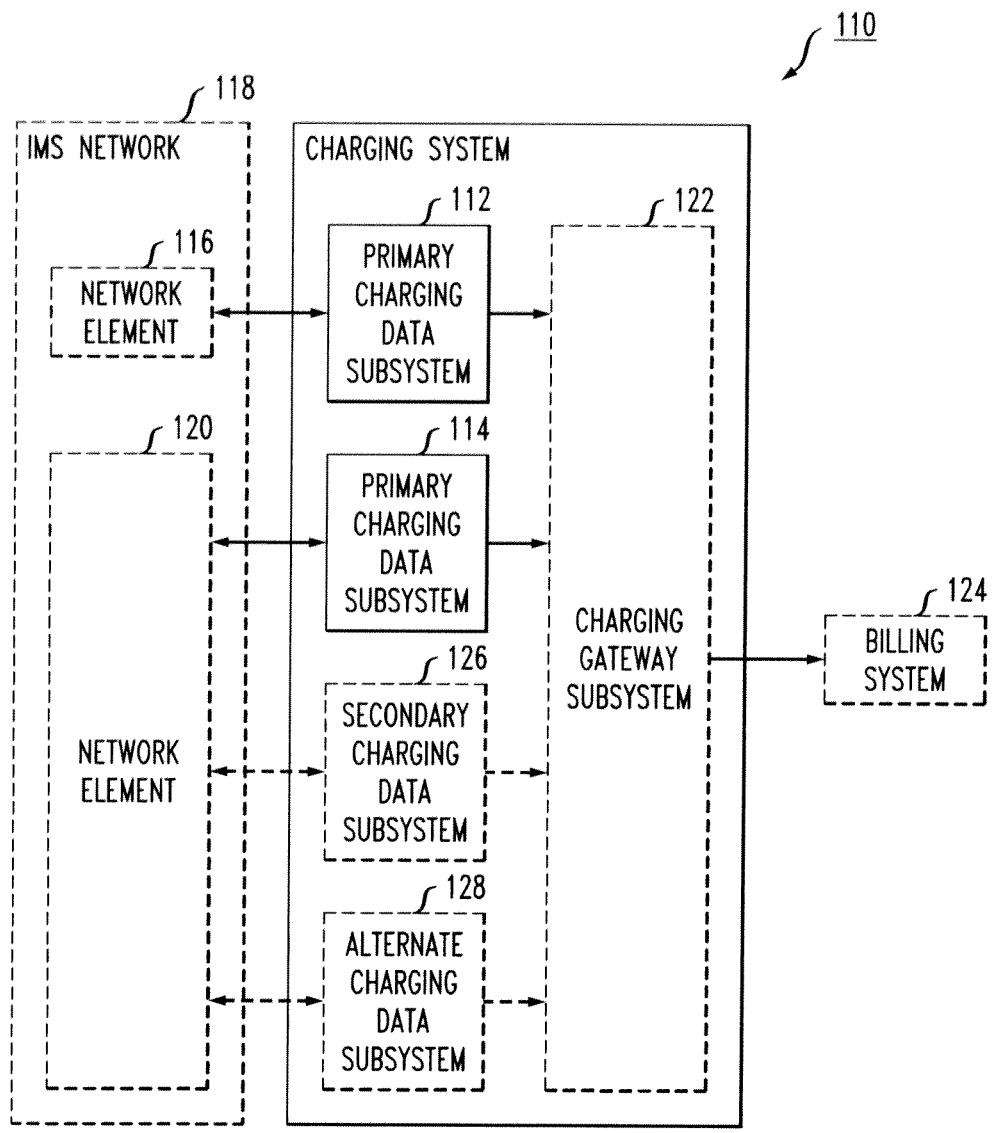
FIG. 11 is a block diagram of another exemplary embodiment of a charging system for facilitating interim billing for an IMS session.

With reference to FIG. 11, an exemplary embodiment of a charging system 110 for facilitating interim billing for an IMS session includes a first primary charging data subsystem 112 and a second primary charging data subsystem 114. The first and second primary charging data subsystems 112, 114 may include any suitable combination of servers, network nodes, and other types of network devices. The first primary charging data subsystem 112 receives time-based interim accounting messages for an IMS session from a first NE 116 of an IMS network 118 serving the IMS session for opening or updating a first interim CDR in response to receiving the time-based interim accounting messages, extracting accounting record numbers from the time-based interim accounting messages, and determining if a partial record closing trigger has been reached for the IMS session. Similarly, the second primary charging data subsystem 114 receives time-based interim accounting messages for the IMS session from a second NE 120 of the IMS network 118 serving the IMS session for opening or updating a second interim CDR in response to receiving the time-based interim accounting messages, extracting accounting record numbers from the time-based interim accounting messages, and determining if a partial record closing trigger has been reached for the IMS session. The accounting record numbers uniquely identify the corresponding time-based interim accounting message in relation to other interim accounting messages from the corresponding NE (e.g., 116, 120) for the IMS session. The partial record closing trigger may be a function of the accounting record number extracted by the corresponding charging data subsystem (e.g., 112, 114) for the corresponding NE (e.g., 116, 120), an AII value accessible to the corresponding charging data subsystem (e.g., 112, 114), and a partial record closing threshold accessible to the corresponding charging data subsystem (e.g., 112, 114), The AII value and partial record closing threshold may be stored in any suitable storage device. The AII value and partial record closing threshold may be stored locally or in a central location.

In this embodiment, if the partial record closing trigger has not been reached and the IMS session is still active, the first and second primary charging data subsystems 112, 114 continue processing time-based interim accounting messages to update the current first and second interim CDRs. Conversely, if the partial record closing trigger has been reached, the first primary charging data subsystem 112 generates a first time-based partial CDR for the first NE 116 from the first interim CDRs opened and updated by the first primary charging data subsystem 112 since any preceding first time-based partial CDR was generated and continues processing time-based interim accounting messages and generating additional first time-based partial CDRs until the first NE 116 is no longer serving the IMS session or the first primary charging data subsystem 112 experiences a fault condition. Similarly, the second primary charging data subsystem 114 generates a second time-based partial CDR for the second NE 120 from the second interim CDRs opened and updated by the second primary charging data subsystem 114 since any preceding second time-based partial CDR was generated and continues processing time-based interim accounting messages and generating additional second time-based partial CDRs until the second NE 120 is no longer serving the IMS session or the second primary charging data subsystem 114 experiences a fault condition. In another embodiment of the charging system 110, the first primary charging data subsystem 112 is also operable to increment a media change count for the first NE 116 in relation to the IMS session by one in response to receiving each of one or more media-based interim accounting message from the first NE 116 during the IMS session. The media change count may be stored in a central storage device accessible to the first primary charging data subsystem 112. The media change count may be stored in any suitable storage device. The first primary charging data subsystem 112 retrieves the media change count from the central storage device in conjunction with determining if the partial record closing trigger has been reached for the IMS session. The partial record closing trigger may also be a function of the media change count.

In yet another embodiment of the charging system 110, the first primary charging data subsystem 112 is also operable to extract a first event time stamp from the corresponding time-based interim accounting message associated with a first updating of the first interim CDR for the IMS session and stores the first event time stamp in a central storage device accessible to the first primary charging data subsystem 112. The first event time stamp may be stored in any suitable storage device. The first primary charging data subsystem 112 extracts a second event time stamp from each time-based interim accounting message associated with updating of the corresponding first interim CDR for the IMS session. The first primary charging data subsystem 112 retrieves the first event time stamp from the central storage device in conjunction with determining if the partial record closing trigger has been reached for the corresponding first time-based partial CDR. The partial record closing trigger may also be a function of the first event time stamp, second event time stamp, and an interim processing tolerance accessible to the first primary charging data subsystem 112. The interim processing tolerance may be stored in any suitable storage device. The interim processing tolerance may be stored locally or in a central location.

In a further embodiment of the charging system 110, the first primary charging data subsystem 112 aggregates the first time-based partial CDR generated in conjunction with each partial record closing trigger with any other partial CDRs associated with the first NE 116 that were generated by the first primary charging data subsystem 112 during the IMS session and not previously aggregated to form a first aggregated partial CDR for the first NE 116 corresponding to each repetition of determining the partial record closing trigger has been reached. Similarly, the second primary charging data subsystem 114 aggregates the second time-based partial CDR generated in conjunction with each partial record closing trigger with any other partial CDRs associated with the second NE 120 that were generated by the second primary charging data subsystem 114 during the IMS session and not previously aggregated to form a second aggregated partial CDR for the second NE 120 corresponding to each repetition of determining the partial record closing trigger has been reached.

In a further embodiment, the charging system 110 also includes a charging gateway subsystem 122 in operative communication with the first and second primary charging data subsystems 112, 114. The charging gateway subsystem 122 may include any suitable combination of servers, network nodes, and other types of network devices. The charging gateway subsystem 122 may be combined or co-located with charging data subsystems (e.g., 112, 114) in any suitable combination of servers, network nodes, and other types of network devices. The charging gateway subsystem 122 correlates the first and second aggregated partial CDRs formed by the first and second primary charging data subsystems 112, 114 in conjunction with a corresponding partial record closing trigger for the IMS session to form a consolidated partial CDR for the IMS session corresponding to each repetition of determining the partial record closing trigger has been reached. The charging gateway subsystem 122 also transfers the consolidated partial CDR to a BS 124 to facilitate interim billing of the IMS session in conjunction with each repetition of determining the partial record closing trigger has been reached.

In another further embodiment, the charging system 110 also includes a secondary charging data subsystem 126 operable to receive time-based interim accounting messages for the IMS session from the second NE 120 if the second primary data charging subsystem 114 develops a fault condition after the second NE 120 performs a failover operation from the second primary charging data subsystem 114 to the secondary charging data subsystem 126. The secondary charging data subsystem 126 may include any suitable combination of servers, network nodes, and other types of network devices. The secondary charging data subsystem 126 may be combined or co-located with other charging data subsystems (e.g., 112, 114) in any suitable combination of servers, network nodes, and other types of network devices. The secondary charging data subsystem 126 operates such that processing of time-based interim accounting messages to open or update first and second interim CDRs, determine if a partial record closing trigger has been reached for the IMS session, generating of the first and second time-based partial CDRs, and forming of the first and second aggregated partial CDRs continue in time relation for the first primary and secondary charging data subsystems 112, 114 in conjunction with each repetition of determining the partial record closing trigger has been reached after the failover operation.

In a further embodiment of the charging system 110, the second primary charging data subsystem 126 is operable to increment a media change count for the second NE in relation to the IMS session by one in response to receiving each of one or more media-based interim accounting message from the second NE 120 during the IMS session prior to the failover operation. The media change count may be stored in a central storage device accessible to the second primary data subsystem and the secondary charging data subsystem. The media change count may be stored in any suitable storage device. The secondary charging data subsystem 126 retrieves the media change count from the central storage device in conjunction with determining if the partial record closing trigger has been reached for the IMS session. The partial record closing trigger may also be a function of the media change count.

The secondary charging data subsystem 126 may increment the media change count for the second NE 120 in relation to the IMS session by one in response to receiving each of one or more media-based interim accounting message from the second NE 120 during the IMS session after the failover operation.

In another further embodiment of the charging system 110, the second primary charging data subsystem 114 is also operable to extract a first event time stamp from the corresponding time-based interim accounting message associated with a first updating of the second interim CDR for the IMS session and stores the first event time stamp in a central storage device accessible to the second primary and secondary charging data subsystems 120, 126. The first event time stamp may be stored in any suitable storage device. The secondary charging data subsystem 126 extracts a second event time stamp from each time-based interim accounting message associated with opening and updating of the corresponding second interim CDR for the IMS session. The secondary charging data subsystem 126 retrieves the first event time stamp from the central storage device in conjunction with determining if the partial record closing trigger has been reached for the corresponding second time-based partial CDR. The partial record closing trigger may also be a function of the first event time stamp, second event time stamp, and an interim processing tolerance accessible to the secondary charging data subsystem. The interim processing tolerance may be stored in any suitable storage device. The interim processing tolerance may be stored locally or in a central location.

In yet another further embodiment of the charging system 110, the secondary charging data subsystem 126 is also operable to extract an initial second event time stamp from the time-based interim accounting message associated with opening of the second interim CDR for the IMS session. The secondary charging data subsystem 126 retrieves a first event time stamp from a central storage device accessible to the second primary and secondary charging data subsystems 114, 126 in conjunction with determining if the partial record closing trigger has been reached for the corresponding second time-based partial CDR, determines the retrieved first event time stamp is a null value, and sets the first event time stamp to the initial second event time stamp. The first event time stamp may be stored in any suitable storage device. The partial record closing trigger may also be a function of the first event time stamp, initial second event time stamp, and an interim processing tolerance accessible to the secondary charging data subsystem. The interim processing tolerance may be stored in any suitable storage device. The interim processing tolerance may be stored locally or in a central location.

The secondary charging data subsystem 126 stores the initial second event time stamp in the central storage device to replace the null value with the first event time stamp. The secondary charging data subsystem 126 extracts a subsequent second event time stamp from each time-based interim accounting message associated with updating of the corresponding second interim CDR for the IMS session. The secondary charging data subsystem 126 retrieves the first event time stamp from the central storage device in conjunction with determining if the partial record closing trigger has been reached for the corresponding second time-based partial CDR. The partial record closing trigger may also be a function of the subsequent second event time stamp.

In still yet another further embodiment of the charging system 110, the secondary charging data subsystem 126 sends a first accounting answer to the second NE 120 with an AII parameter reduced from the AII value by a retry offset value accessible to the secondary charging data subsystem 126 in response to receiving the time-based interim accounting message associated with opening an initial second interim CDR for the IMS session after the failover operation. The retry offset value may be stored in any suitable storage device. The retry offset value may be stored locally or in a central location. The secondary charging data subsystem 126 sends a second accounting answer to the second NE 120 with the AII parameter reset to the AII value in response to receiving the time-based interim accounting message associated with a first updating of the initial secondary interim charging record for the IMS session.

In a further alternate embodiment, the charging system 110 includes an alternate charging data subsystem 128 operable to receive time-based interim accounting messages for the IMS session from the second NE 120 if the secondary data charging subsystem 126 develops a fault condition after the second NE 120 performs a failover operation from the secondary charging data subsystem 126 to the alternate charging data subsystem 128. The alternate charging data subsystem 128 may include any suitable combination of servers, network nodes, and other types of network devices. The alternate charging data subsystem 128 may be combined or co-located with other charging data subsystems (e.g., 112, 114) in any suitable combination of servers, network nodes, and other types of network devices. The alternate charging data subsystem 128 operates such that processing of time-based interim accounting messages to open or update first and second interim CDRs, determine if a partial record closing trigger has been reached for the IMS session, generating of the first and second time-based partial CDRs, and forming of first and second aggregated partial CDRs continue in time relation for the first primary and alternate charging data subsystems 112, 128 in conjunction with each repetition of determining the partial record closing trigger has been reached after the failover operation.

Figure 12:
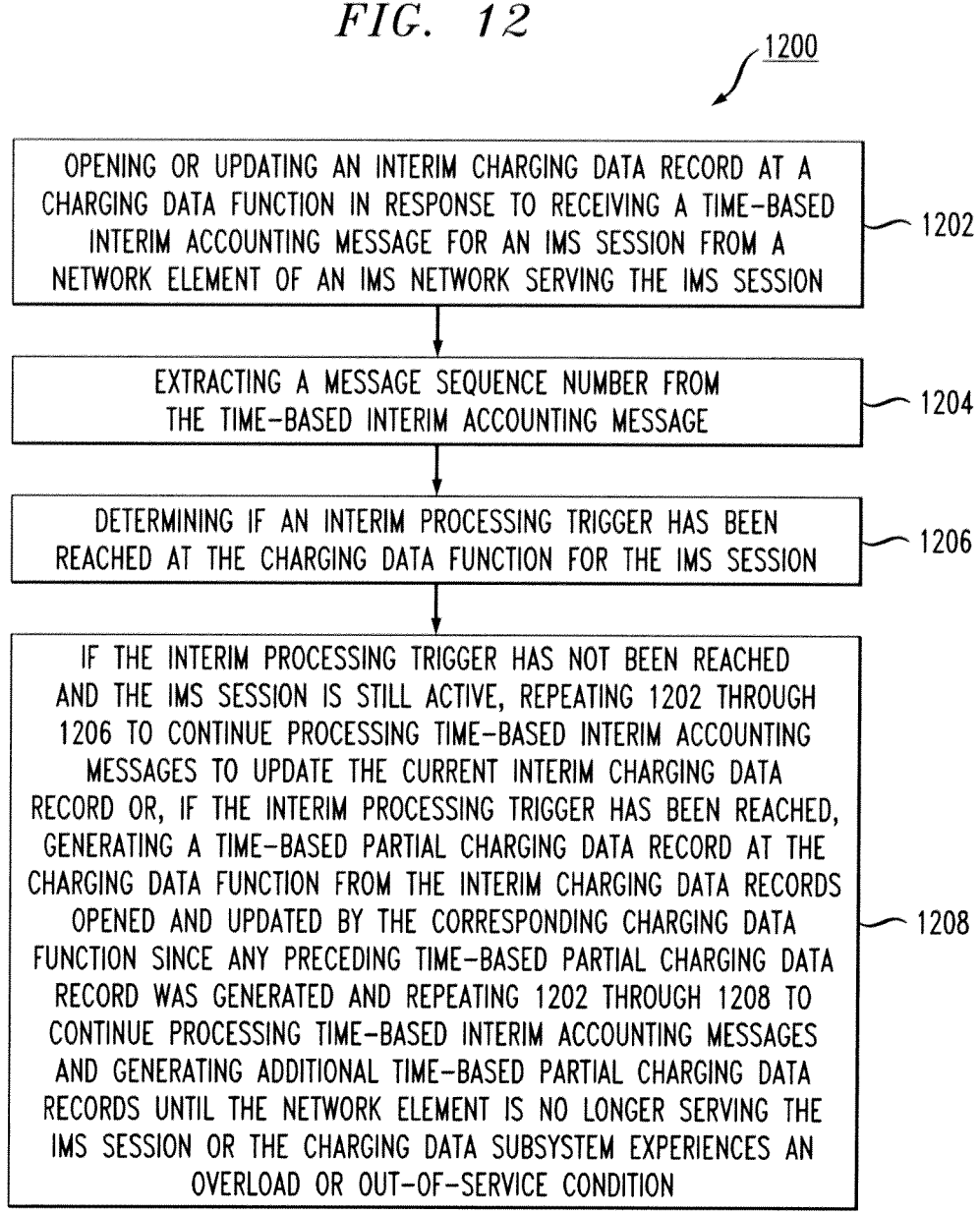
FIG. 12 is a flow chart of yet another exemplary embodiment of a process for facilitating interim billing for an IMS session.

With reference to FIG. 12, an exemplary embodiment of a process 1200 for facilitating interim billing for an IMS session begins at 1202 where an interim CDR is either opened or updated at a CDF in response to receiving a time-based interim accounting message for an IMS session from a NE of an IMS network. The interim CDRs may be stored in any suitable storage device. The interim CDRs may be stored locally or in a central location. Next, a message sequence number is extracted from the time-based interim accounting message (1204). The message sequence number uniquely identifying the time-based interim accounting message in relation to other interim accounting messages from the NE for the IMS session. At 1206, the process 1200 determines if an interim processing trigger has been reached at the CDF for the IMS session. The interim processing trigger may be a function of the message sequence number extracted in 1204, a message interval value accessible to the CDF, and an interim processing threshold accessible to the CDF. The interim processing trigger function may include any suitable expression of the message sequence number, message interval value, and interim processing threshold. The message sequence number, message interval value, and interim processing threshold may be stored in any suitable storage device. The message sequence number, message interval value, and interim processing threshold may be stored locally or in a central location. Similarly, the time-based partial CDR may be stored in any suitable storage device. The time-based partial CDR may be stored locally or in a central location.

At 1208, if the interim processing trigger has not been reached and the IMS session is still active, the process 1200 repeats 1202 through 1206 to continue processing time-based interim accounting messages to update the current interim CDR. Conversely, if the interim processing trigger has been reached, time-based partial CDR are generated at the CDF from the interim CDRs opened and updated by the corresponding CDF since any preceding time-based partial CDR was generated and 1202 through 1208 are repeated to continue processing time-based interim accounting messages and generating additional time-based partial CDRs until the NE is no longer serving the IMS session or the charging data subsystem experiences an overload or OOS condition. The time-based partial CDRs may be stored in any suitable storage device. The time-based partial CDRs may be stored locally or in a central location.

In another embodiment, the process 1200 may also include incrementing a media change count for the NE in relation to the IMS session by one in response to receiving each of one or more media-based interim accounting message from the NE during the IMS session. The media change count being stored in a storage device accessible to the CDF. The media change count may be stored in any suitable storage device. The media change count may be stored locally or in a central location. The media change count may be rectrieved from the storage device in conjunction with the determining in 1206. The interim processing trigger in 1206 may also be a function of the media change count retrieved from storage.

In a further embodiment of the process 1200, an expression for the interim processing trigger in 1206 comprises (N−m) Modulo (T/t), where N is the message sequence number, m is the media change count, T is the interim processing threshold, and t is the message interval value. The interim processing trigger has been reached when the expression is equal to zero.

In yet another embodiment, the process 1200 may also include extracting a first event time stamp from the time-based interim accounting message associated with updating the interim CDR in 1202 during a first repetition of 1202 through 1208. The first event time stamp may be stored in a storage device accessible to the CDF. The first event time stamp may be stored in any suitable storage device. The first event time stamp may be stored locally or in a central location. A second event time stamp may be extracted from the time-based interim accounting message associated with the updating in 1202 during a subsequent repetition of 1202 through 1208. The first event time stamp may be retrieved from the storage device in conjunction with the determining in 1206 during the subsequent repetition of 1202 through 1208. The process 1200 may repeat extracting the second event time stamp and retrieving the first event time stamp until determining the interim process trigger to the IMS session has been reached. After determining the interim process trigger to the IMS session has been reached, the process 1200 may repeat extracting and storing the first event time stamp as well as extracting the second event time stamp and retrieving the first event time stamp. The interim processing trigger in 1206 may also be a function of the first event time stamp retrieved from storage, the second event time stamp extracted from the time-based interim accounting message, and an interim processing tolerance accessible to the CDF. The interim processing tolerance may be stored in any suitable storage device. The interim processing tolerance may be stored locally or in a central location. An expression shows the interim processing trigger is reached when a difference between the second event time stamp and a start event time stamp for an interim processing cycle are within the interim processing tolerance of the interim processing threshold. The start event time stamp is the first event time stamp less the message interval value.

Figure 13:
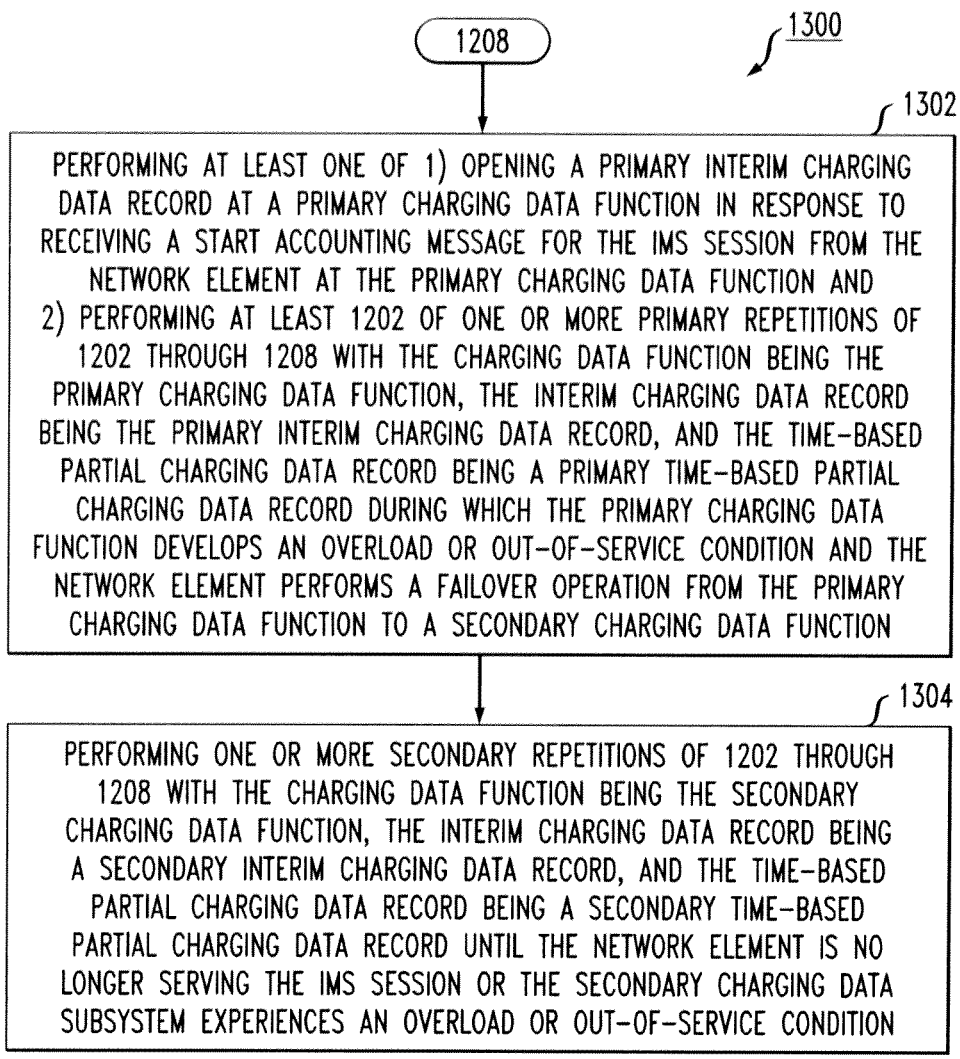
FIG. 13, in conjunction with FIG. 12, is a flow chart of still another exemplary embodiment of a process for facilitating interim billing for an IMS session.

With reference to FIGS. 12 and 13, another exemplary embodiment of a process 1300 for facilitating interim billing for an IMS session continues from 1208 with 1302 where at least one of 1) opening a primary interim CDR at a primary CDF in response to receiving a start accounting message for the IMS session from the NE at the primary CDF and 2) performing at least 1202 of one or more primary repetitions of 1202 through 2108 are performed with the CDF being the primary CDF, the interim CDR being the primary interim CDR, and the time-based partial CDR being a primary time-based partial CDR during which the primary CDF develops an overload or OOS condition and the NE performs a failover operation from the primary CDF to a secondary CDF. Next, one or more secondary repetitions of 1202 through 1208 are performed with the CDF being the secondary CDF, the interim CDR being a secondary interim CDR, and the time-based partial CDR being a secondary time-based partial CDR until the NE is no longer serving the IMS session or the secondary charging data subsystem experiences an overload or OOS condition (1204). The secondary CDF may include any suitable combination of servers, network nodes, and other types of network devices. The secondary CDF may be combined or co-located with other CDFs in any suitable combination of servers, network nodes, and other types of network devices.

In another embodiment, the process 1300 may also include incrementing a media change count for the NE in relation to the IMS session by one in response to receiving each of one or more media-based interim accounting message from the NE during the one or more primary repetitions of 1202 through 1208. The media change count being stored in a storage device accessible to the primary and secondary CDFs. The media change count may be stored in any suitable storage device. The media change count may be stored locally or in a central location. At the secondary CDF, the media change count for the IMS session may be retrieved from the storage device during each repetition of the one or more secondary repetitions of 1202 through 1208 in conjunction with the determining in 1206. The interim processing trigger in 1206 may also be a function of the media change count retrieved from storage.

In a further embodiment of the process 1300, an expression for the interim processing trigger in 1206 comprises (N−m) Modulo (T/t), where N is the message sequence number, m is the media change count, T is the interim processing threshold, and t is the message interval value. The interim processing trigger has been reached when the expression is equal to zero.

In another further embodiment, the process 1300 may also include, from the secondary CDF, incrementing the media change count for the IMS session stored in the storage device by one in response to receiving each of one or more media-based interim accounting message from the NE during the one or more secondary repetitions of 1202 through 1208.

In yet another embodiment, the process 1300 may also include extracting a first event time stamp from the time-based interim accounting message associated with updating the primary interim CDR in 1202 during a first primary repetition of the one or more primary repetitions of 1202 through 1208. The first event time stamp may be stored in a storage device accessible to the primary and secondary CDFs. The first event time stamp may be stored in any suitable storage device. The first event time stamp may be stored locally or in a central location. At the secondary CDF, a second event time stamp may be extracted from the time-based interim accounting message associated with the opening or updating in 1202 during a secondary repetition of the one or more secondary repetitions of 1202 through 1208. At the secondary CDF, retrieving the first event time stamp from the storage device in conjunction with the determining in 1206 during the secondary repetition of the one or more secondary repetitions of 1202 through 1208. For the secondary CDF, the process 1300 may repeat extracting the second event time stamp and retrieving the first event time stamp until determining the interim process trigger to the IMS session has been reached. After determining the interim process trigger to the IMS session has been reached, the process 1300 may repeat extracting and storing the first event time stamp as well as extracting the second event time stamp and retrieving the first event time stamp. The interim processing trigger in 1206 may also be a function of the first event time stamp retrieved from storage, the second event time stamp extracted the time-based interim accounting message, and an interim processing tolerance accessible to the secondary CDF. The interim processing tolerance may be stored in any suitable storage device. The interim processing tolerance may be stored locally or in a central location. An expression shows the interim processing trigger is reached when a difference between the second event time stamp and a start event time stamp for an interim processing cycle are within the interim processing tolerance of the interim processing threshold. The start event time stamp is the first event time stamp less the message interval value.

In still another embodiment, the process 1300 may also include, at the secondary CDF, extracting an initial second event time stamp from the time-based interim accounting message associated with opening an initial secondary interim CDR for the IMS session. At the secondary CDF, a first event time stamp may be retrieved from a storage device accessible to the primary and secondary CDFs in conjunction with the determining in 1206 during the initial repetition of the one or more secondary repetitions of 1202 through 1208. The first event time stamp may be stored in any suitable storage device. The first event time stamp may be stored locally or in a central location. At the secondary CDF, the process 1300 may determine the first event time stamp retrieved from storage is a null value and may set the first event time stamp to the initial second event time stamp extracted from the time-based interim accounting message. The interim processing trigger in 1206 may also be a function of the first event time stamp after it is set to the initial second event time stamp, the initial second event time stamp extracted from the time-based interim accounting message, and an interim processing tolerance accessible to the secondary CDF. The interim processing tolerance may be stored in any suitable storage device. The interim processing tolerance may be stored locally or in a central location. An expression shows the interim processing trigger is reached when a difference between the initial second event time stamp and a start event time stamp for an interim processing cycle are within the interim processing tolerance of the interim processing threshold. The start event time stamp is the first event time stamp less the message interval value.

In a further embodiment, the process 1300 may also include, from the secondary CDF, storing the initial second event time stamp in the storage device to replace the null value with the first event time stamp. At the secondary CDF, a subsequent second event time stamp may be extracted from the time-based interim accounting message associated with updating the secondary interim CDR during a subsequent repetition of the one or more secondary repetitions of 1202 through 1208. At the secondary CDF, the first event time stamp may be retrieved from the storage device in conjunction with the determining in 1206 during the subsequent repetition of the one or more secondary repetitions of 1202 through 1208. For the secondary CDF, the process 1300 may repeat extracting the subsequent second event time stamp and retrieving the first event time stamp until determining the interim process trigger to the IMS session has been reached. The interim processing trigger may also be a function of the subsequent second event time stamp extracted from the time-based interim accounting message. An expression shows the interim processing trigger is reached when a difference between the subsequent second event time stamp and the start event time stamp for the interim processing cycle are within the interim processing tolerance of the interim processing threshold.

In still yet another embodiment, the process 1300 may also include sending a first accounting answer from the secondary CDF to the NE with an AII parameter reduced from the message interval value by a retry offset value accessible to the secondary CDF in response to receiving the time-based interim accounting message in 1202 associated with opening an initial secondary interim CDR for the IMS session. The retry offset value may be stored in any suitable storage device. The retry offset value may be stored locally or in a central location. A second accounting answer may be sent from the secondary CDF to the NE with the AII parameter reset to the message interval value in response to receiving the time-based interim accounting message associated with a first updating of the initial secondary interim charging record for the IMS session.

Figure 14:
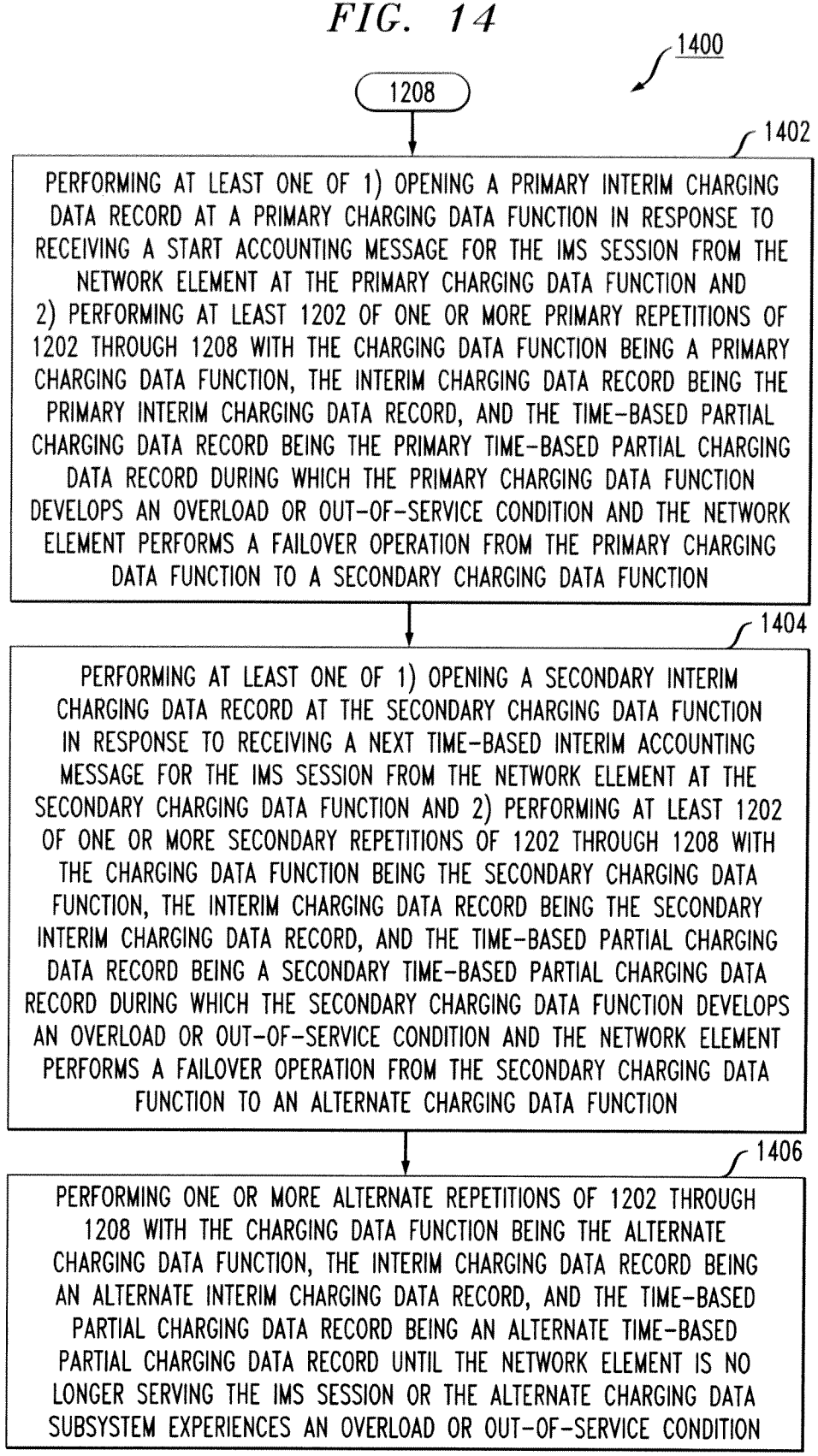
FIG. 14, in conjunction with FIG. 12, is a flow chart of still yet another exemplary embodiment of a process for facilitating interim billing for an IMS session.

With reference to FIGS. 12 and 14, yet another exemplary embodiment of a process 1400 for facilitating interim billing for an IMS session continues from 1208 with 1402 where at least one of 1) opening a primary interim CDR at a primary CDF in response to receiving a start accounting message for the IMS session from the NE at the primary CDF and 2) performing at least 1202 of one or more repetitions of 1202 through 1208 are performed with the CDF being the primary CDF, the interim CDR being the primary interim CDR, and the time-based partial CDR being a primary time-based partial CDR during which the primary CDF develops an overload or OOS condition and the NE performs a failover operation from the primary CDF to a secondary CDF. Next, at least one of 1) opening a secondary interim CDR at a secondary CDF in response to receiving a next time-based interim accounting message for the IMS session from the NE at the secondary CDF and 2) performing at least 1202 of one or more secondary repetitions of 1202 through 1208 are performed with the CDF being the secondary CDF, the interim CDR being the secondary interim CDR, and the time-based partial CDR being a secondary time-based partial CDR during which the secondary CDF develops an overload or OOS condition and the NE performs a failover operation from the secondary CDF to an alternate CDF (1404). At 1406, one or more alternate repetitions of 1202 through 1208 are performed with the CDF being the alternate CDF, the interim CDR being an alternate interim CDR, and the time-based partial CDR being an alternate time-based partial CDR until the NE is no longer serving the IMS session or the alternate charging data subsystem experiences an overload or OOS condition. The alternate CDF may include any suitable combination of servers, network nodes, and other types of network devices. The alternate CDF may be combined or co-located with other CDFs in any suitable combination of servers, network nodes, and other types of network devices.

Figure 16:
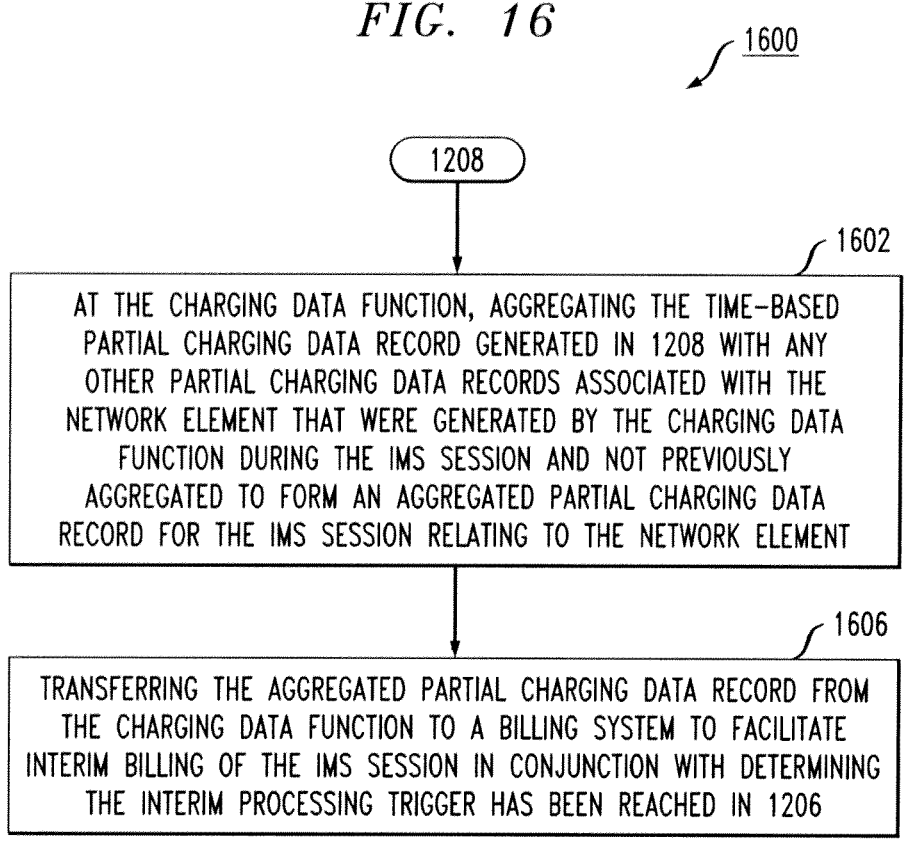
FIG. 16, in conjunction with FIG. 12, is a flow chart of yet another exemplary embodiment of a process for facilitating interim billing for an IMS session.

With reference to FIGS. 12 and 16, still yet another exemplary embodiment of a process 1600 for facilitating interim billing for an IMS session continues from 1206 with 1602 where the CDF aggregates the time-based partial CDR generated in 1208 with any other partial CDRs associated with the NE that were generated by the CDF during the IMS session and not previously aggregated to form an aggregated partial CDR for the IMS session relating to the NE. The aggregated partial CDRs may be stored in any suitable storage device. The aggregated partial CDRs may be stored locally or in a central location. Next, the aggregated partial CDR may be transferred from the CDF to a BS to facilitate interim billing of the IMS session (1606).

In another embodiment, the process 1200 may also include aggregating the time-based partial CDR generated in 1208 with any other partial CDRs associated with the NE that were generated by the CDF during the IMS session and not previously aggregated to form an aggregated partial CDR for the IMS session relating to the NE. At a CGF, the aggregated partial CDR formed in the CDF with any other aggregated partial CDRs associated with other NEs of the IMS network that were generated for the IMS session and not previously correlated to form a consolidated partial CDR for the IMS session. The consolidated partial CDR may be transferred from the CGF to a BS to facilitate interim billing of the IMS session in conjunction with determining the interim processing trigger has been reached in 1206.

Figure 17:
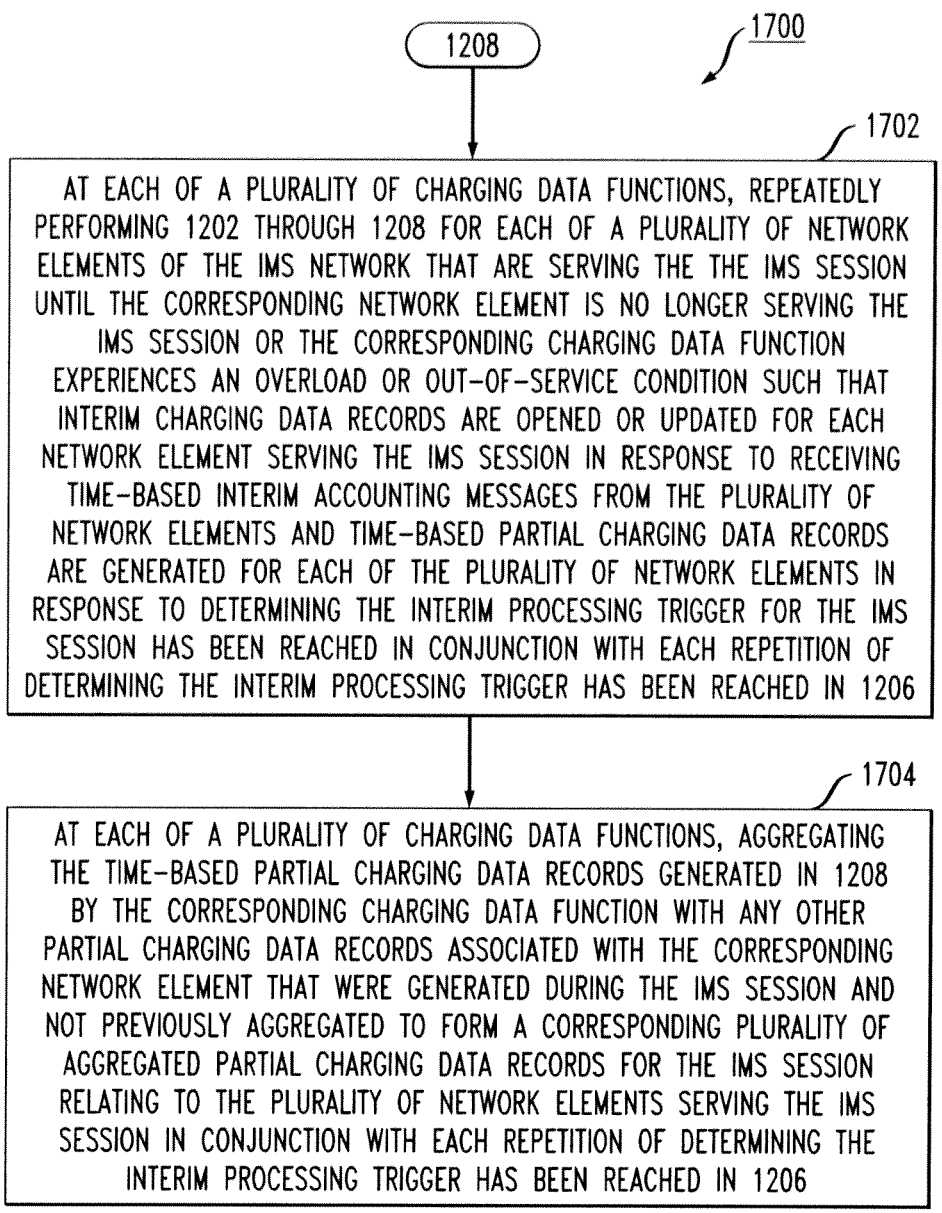
FIG. 17, in conjunction with FIG. 12, is a flow chart of still another exemplary embodiment of a process for facilitating interim billing for an IMS session.

With reference to FIGS. 12 and 17, another exemplary embodiment of a process 1700 for facilitating interim billing for an IMS session continues from 1206 with 1702 where each of a plurality of CDFs perform 1202 through 1208 for each of a plurality of NEs of the IMS network that are serving the IMS session until the corresponding NE is no longer serving the IMS session or the corresponding CDF experiences an overload or OOS condition such that interim CDRs are opened or updated for each NE serving the IMS session in response to receiving time-based interim accounting messages from the plurality of NEs and time-based partial CDRs are generated for each of the plurality of NEs in response to determining the interim processing trigger for the IMS session has been reached in conjunction with each repetition of determining the interim processing trigger has been reached in 1206. At 1704, each of the plurality of CDFs aggregate the time-based partial CDRs generated in 1208 by the corresponding CDF with any other partial CDRs associated with the corresponding NE that were generated by the corresponding CDF during the IMS session and not previously aggregated to form a corresponding plurality of aggregated partial CDRs for the IMS session relating to the plurality of NEs serving the IMS session in conjunction with each repetition of determining the interim processing trigger has been reached in 1206.

In a further embodiment the process 1700 may also include, at a CGF, correlating the plurality of aggregated partial CDRs formed in 1704 to form a consolidated partial CDR for the IMS session. The consolidated partial CDRs may be transferred from the CGF to a BS to facilitate interim billing of the IMS session in conjunction with determining the interim processing trigger has been reached in 1206.

With continuing reference to the various exemplary embodiments of the process (i.e., 1200, 1300, 1400, 1500, 1600, 1700) in FIGS. 12-17, in further embodiments, the message interval value in the corresponding process may relate to transmission of time-based interim accounting messages between start and stop accounting messages by NEs for the IMS session and may indicate a predetermined time interval between each time-based interim accounting message and a preceding start or time-based interim accounting message. In other embodiments, the interim processing threshold may define a predetermined time interval between generation of time-based partial CDRs for the IMS session.

In a further embodiment, the interim processing threshold may be a positive integer multiple of the message interval value. For example, the interim processing threshold may be 6 H and the message interval value may be 0.25 H. Similarly, the interim processing threshold may evenly divide into a predetermined period of calendar time. For example, the interim processing threshold may by 6 H and the predetermined period of calendar time may be 24 H.

In another further embodiment, the interim processing threshold may be a function of the message interval value. For example, an expression of the interim processing threshold function may comprise T=n*t, where T is the interim processing threshold, n is an integer $\geq 1$, and t is the message interval value. In yet another further embodiment, an expression of the interim processing trigger function may comprise (N) Modulo (T/t), where N is the message sequence number, T is the interim processing threshold, and t is the message interval value. The interim processing trigger has been reached when the expression is equal to zero.

In still yet another further embodiment, prior to 1202, the CDF opens the interim CDR at the CDF in response to receiving a start accounting message for the IMS session from the NE. In another further embodiment, the process also includes generating a media-based partial CDR from the interim CDR at the CDF for the IMS session in relation to the NE in response to receiving a media change accounting message for the IMS session from the NE. The media-based partial CDR may be stored in any suitable storage device. The media-based partial CDR may be stored locally or in a central location.

In another further embodiment, the process also includes generating an end-of-session partial CDR from the interim CDR at the CDF for the IMS session in relation to the NE in response to receiving a stop accounting message for the IMS session from the NE. The end-of-session partial CDR may be stored in any suitable storage device. The end-of-session partial CDR may be stored locally or in a central location.

In yet another further embodiment, the process also includes generating an event-based partial CDR from the interim CDR at the CDF for the IMS session in relation to the NE in response to receiving an event accounting message from the NE. The event-based partial CDR may be stored in any suitable storage device. The event-based partial CDR may be stored locally or in a central location.

Figure 18:
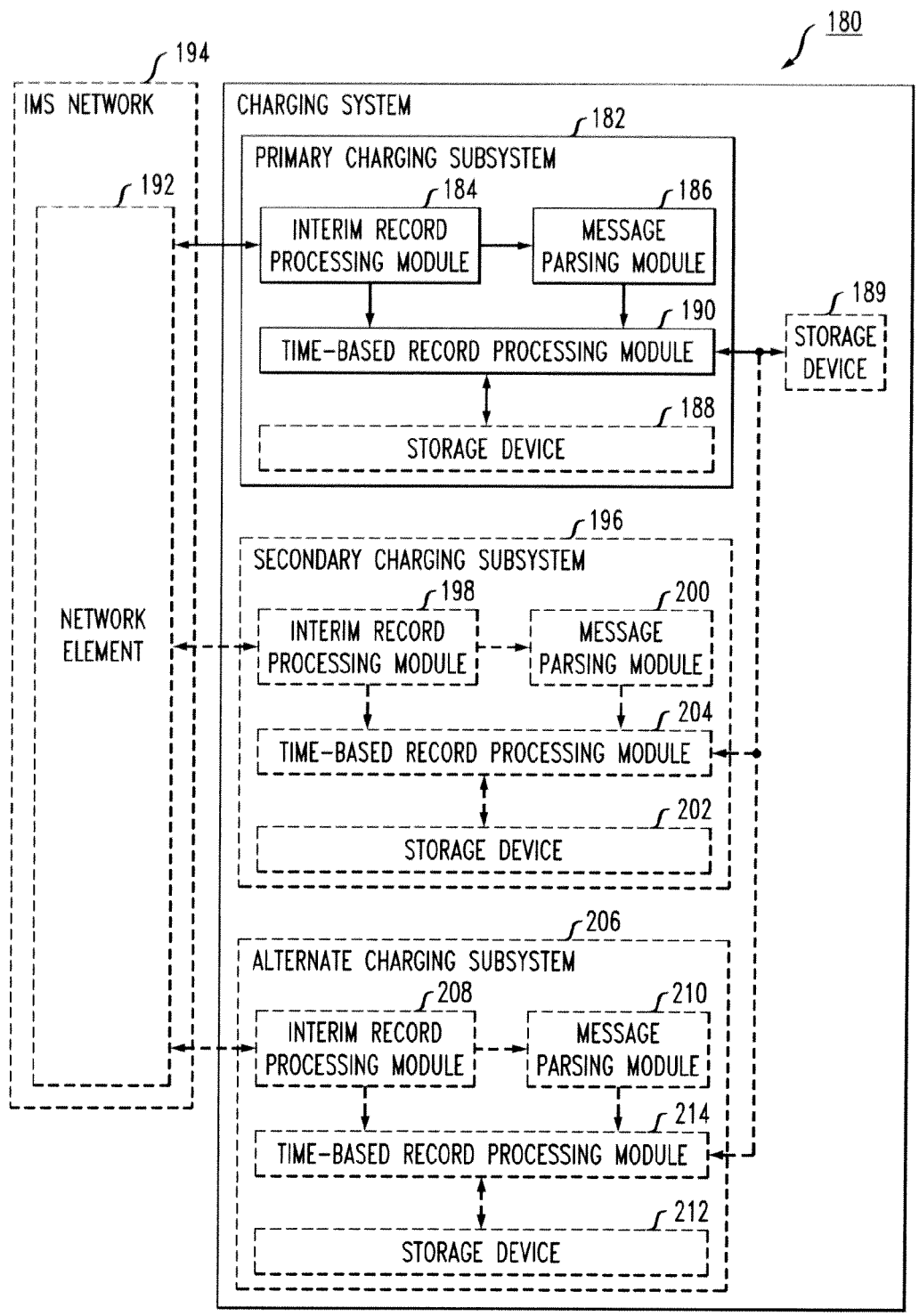
FIG. 18 is a block diagram of yet another exemplary embodiment of a charging system for facilitating interim billing for an IMS session.

With reference to FIG. 18, an exemplary embodiment of a charging system 180 for facilitating interim billing for an IMS session includes a first primary charging data subsystem 182 operable to receive time-based interim accounting messages for an IMS session from a first NE 192 of an IMS network 194 serving the IMS session. The first primary charging data subsystem 182 may include any suitable combination of servers, network nodes, and other types of network devices. In one embodiment, the first primary charging data subsystems 182 includes a first interim record processing module 184, a first message parsing module 186, and a first time-based record processing module 190. The first primary charging data subsystem 182 may optionally include a local storage device 188. The first primary charging data subsystem 182 may also or alternatively have access to a central storage device 189. The first interim record processing module 184 opens or updates a primary interim CDR in response to receiving the time-based interim accounting messages for the IMS session from the first NE 192.

The first message parsing module 186 is in operative communication with the first interim record processing module 184. The first interim record processing module 184 extracts a message sequence number from the time-based interim accounting messages. The message sequence number uniquely identifying each time-based interim accounting message in relation to other interim accounting messages from the first NE 192 for the IMS session.

The first time-based record processing module 190 is in operative communication with the first interim record processing module 184 and first message parsing module 186. The first time-based record processing module 190 determines if an interim processing trigger has been reached for the IMS session. The interim processing trigger may be a function of the message sequence number, a message interval value accessible to the first time-based record processing module via the local storage device 188 or the central storage device 189, and an interim processing threshold accessible to the first time-based record processing module 190 via the local storage device 188 or the central storage device 189.

If the interim processing trigger has not been reached and the IMS session is still active, the first primary charging data subsystem 182 continues processing time-based interim accounting messages to update the current primary interim CDR. Conversely, if the interim processing trigger has been reached, the first time-based record processing module 190 generates a primary time-based partial CDR from the primary interim CDRs opened and updated by the first interim record processing module 184 since any preceding primary time-based partial CDR was generated and the first primary charging data subsystem 182 continues processing time-based interim accounting messages and generating additional primary time-based partial CDRs until the first NE 192 is no longer serving the IMS session or the first primary charging data subsystem 182 experiences an overload or OOS condition.

In another embodiment of the charging system 180, the first interim record processing module 184 is also operable to receive media-based interim accounting messages for the IMS session from the first NE 194. The first primary charging data subsystem 182 may also include a media-based record processing module (see FIG. 19, item 226) in operative communication with the first interim record processing module 184 for incrementing a media change count for the first NE 192 in relation to the IMS session by one in response to receiving each of one or more media-based interim accounting message from the first NE 192 during the IMS session. The media change count may be stored in the central storage device 189. The first time-based record processing module 190 may retrieve the media change count for the IMS session from the central storage device 189 in conjunction with determining if the interim processing trigger has been reached for the IMS session. The interim processing trigger may also be a function of the media change count.

In yet another embodiment of the charging system 180, the first message parsing module 186 may extract a first event time stamp from the corresponding time-based interim accounting message associated with a first updating of the primary interim CDR by the first interim record processing module 184 for the IMS session. The first message parsing module 186 may store the first event time stamp in the central storage device 189. The first message parsing module 186 may extract a second event time stamp from each time-based interim accounting message associated with updating of the corresponding primary interim CDR by the first interim record processing module for the IMS session. The first time-based record processing module 190 may retrieve the first event time stamp from the central storage device 189 in conjunction with determining if the interim processing trigger has been reached for the corresponding primary time-based partial CDR. The interim processing trigger may also be a function of the first event time stamp, second event time stamp, and an interim processing tolerance accessible to the first time-based record processing module 190 via the local storage device 188 or the central storage device 189.

In another embodiment, the charging system 180 also includes a secondary charging data subsystem 196 operable to receive the time-based interim accounting messages for the IMS session from the first NE 192 in conjunction with the first NE 192 detecting an overload or OOS condition associated with the first primary charging data subsystem 182 and performing a failover operation from the first primary charging data subsystem 182 to the secondary charging data subsystem 196. The secondary charging data subsystem 196 may include any suitable combination of servers, network nodes, and other types of network devices. The secondary charging data subsystem 196 may be combined or co-located with other charging data subsystems (e.g., 182) in any suitable combination of servers, network nodes, and other types of network devices.

The secondary charging data subsystem 196 includes a second interim record processing module 198, a second message parsing module 200, and a second time-based record processing module 204. The secondary charging data subsystem 196 may optionally include a local storage device 202. The secondary charging data subsystem 196 may also or alternatively have access to the central storage device 189. The second interim record processing module 198 opens or updates a secondary interim CDR in response to receiving the time-based interim accounting messages for the IMS session from the first NE 192. The second message parsing module 200 is in operative communication with the second interim record processing module 198 and extracts the message sequence number from the time-based interim accounting messages. The second time-based record processing module 204 is in operative communication with the second interim record processing module 198 and second message parsing module 200. The second time-based record processing module 198 determines if the interim processing trigger has been reached for the IMS session.

If the interim processing trigger has not been reached and the IMS session is still active, the secondary charging data subsystem 196 continues processing time-based interim accounting messages to update the current secondary interim CDR. Conversely, if the interim processing trigger has been reached, the second time-based record processing module 202 generates a secondary time-based partial CDR from the secondary interim CDRs opened and updated by the second interim record processing module 198 since any preceding secondary time-based partial CDR was generated and the secondary charging data subsystem 196 continues processing time-based interim accounting messages and generating additional secondary time-based partial CDRs until the first NE 192 is no longer serving the IMS session or the secondary charging data subsystem 196 experiences an overload or OOS condition.

In a further embodiment of the charging system 180 the first interim record processing module 184 is operable to receive media-based interim accounting messages for the IMS session from the first NE. The first primary charging data subsystem 182 may also include a first media-based record processing module (see FIG. 19, item 226) in operative communication with the first interim record processing module 184 for incrementing a media change count for the first NE 192 in relation to the IMS session by one in response to receiving each of one or more media-based interim accounting message from the first NE 192 during the IMS session prior to the failover operation. The media change count may be stored in the central storage device 189. The second time-based record processing module 204 may retrieve the media change count from the central storage device 189 in conjunction with determining if the interim processing trigger has been reached for the IMS session. The interim processing trigger may also be a function of the media change count.

In a still further embodiment of the charging system 180, the second interim record processing module 198 is operable to receive media-based interim accounting messages for the IMS session from the first NE 192. The secondary charging data subsystem 196 may also include a second media-based record processing module (e.g., see FIG. 19, item 226) in operative communication with the second interim record processing module 198 for incrementing the media change count for the first NE 192 in relation to the IMS session by one in response to receiving each of one or more media-based interim accounting message from the first NE 192 during the IMS session after the failover operation.

In another further embodiment of the charging system 180, the first message parsing module 186 may extract a first event time stamp from the corresponding time-based interim accounting message associated with a first updating of the primary interim CDR by the first interim record processing module 184 for the IMS session. The first message parsing module 186 may store the first event time stamp in the central storage device 189. The second message parsing module 200 may extract a second event time stamp from each time-based interim accounting message associated with opening and updating of the corresponding secondary interim CDR by the second interim record processing module 200 for the IMS session. The second time-based record processing module 204 may retrieve the first event time stamp from the central storage device 189 in conjunction with determining if the interim processing trigger has been reached for the corresponding secondary time-based partial CDR. The interim processing trigger may also be a function of the first event time stamp, second event time stamp, and an interim processing tolerance accessible to the second time-based record processing module 204 via the local storage device 202 or the central storage device 189.

In yet another further embodiment of the charging system 180, the second message parsing module 200 may extract an initial second event time stamp from the time-based interim accounting message associated with opening of the secondary interim CDR by the second interim record processing module 198 for the IMS session. The second time-based record processing module 204 may retrieve a first event time stamp from the central storage device 189 in conjunction with determining if the interim processing trigger has been reached for the corresponding secondary time-based partial CDR, determine the retrieved first event time stamp is a null value, and set the first event time stamp to the initial second event time stamp extracted by the second message parsing module 200. The interim processing trigger may also be a function of the first event time stamp, initial second event time stamp, and an interim processing tolerance accessible to the second time-based record processing module 204 via local storage device 202 or the central storage device 189.

In a still further embodiment of the charging system 180, the second time-based record processing module 204 may store the initial second event time stamp in the central storage device 189 to replace the null value with the first event time stamp. The second message parsing module 200 may extract a subsequent second event time stamp from each time-based interim accounting message associated with updating of the corresponding secondary interim CDR by the second interim record processing module 198 for the IMS session. The second time-based record processing module 204 may retrieve the first event time stamp from the central storage device 189 in conjunction with determining if the interim processing trigger has been reached for the corresponding secondary time-based partial CDR. The interim processing trigger may also be a function of the subsequent second event time stamp.

In still another further embodiment of the charging system 180, the second interim record processing module 204 may send a first accounting answer to the first NE 192 with an AII parameter reduced from the message interval value by a retry offset value accessible to the second interim record processing module 184 in response to receiving the time-based interim accounting message associated with opening an initial secondary interim CDR for the IMS session after the failover operation. The second interim record processing module 184 may send a second accounting answer to the first NE 192 with the AII parameter reset to the message interval value in response to receiving the time-based interim accounting message associated with a first updating of the initial secondary interim charging record for the IMS session.

In another embodiment, the charging system 180 also includes an alternate charging data subsystem 206 to receive the time-based interim accounting messages for the IMS session from the first NE 192 in conjunction with the first NE 192 detecting an overload or OOS condition associated with the secondary charging data subsystem 196 and performing a failover operation from the secondary charging data subsystem 196 to the alternate charging data subsystem 206. The alternate charging data subsystem 206 may include any suitable combination of servers, network nodes, and other types of network devices. The alternate charging data subsystem 206 may be combined or co-located with other charging data subsystems (e.g., 182, 196) in any suitable combination of servers, network nodes, and other types of network devices.

The alternate charging data subsystem 206 includes a third interim record processing module 208, a third message parsing module 210, and a third time-based record processing module 214. The alternate charging data subsystem 206 may optionally include a local storage device 212. The alternate charging data subsystem 206 may also or alternatively have access to the central storage device 189. The third interim record processing module 208 opens or updates an alternate interim CDR in response to receiving the time-based interim accounting messages for the IMS session from the first NE 192. The third message parsing module 210 is in operative communication with the third interim record processing module 208 and extracts the message sequence number from the time-based interim accounting messages. The third time-based record processing module 214 is in operative communication with the third interim record processing module 208 and third message parsing module 210. The third interim record processing module 208 determines if the interim processing trigger has been reached for the IMS session.

If the interim processing trigger has not been reached and the IMS session is still active, the alternate charging data subsystem 206 continues processing time-based interim accounting messages to update the current alternate interim CDR. Conversely, if the interim processing trigger has been reached, the third time-based record processing module 214 generates an alternate time-based partial CDR from the alternate interim CDRs opened and updated by the third interim record processing module 198 since any preceding alternate time-based partial CDR was generated and the alternate charging data subsystem 206 continues processing time-based interim accounting messages and generating additional alternate time-based partial CDRs until the first NE 192 is no longer serving the IMS session or the alternate charging data subsystem 206 experiences an overload or OOS condition.

Figure 19:
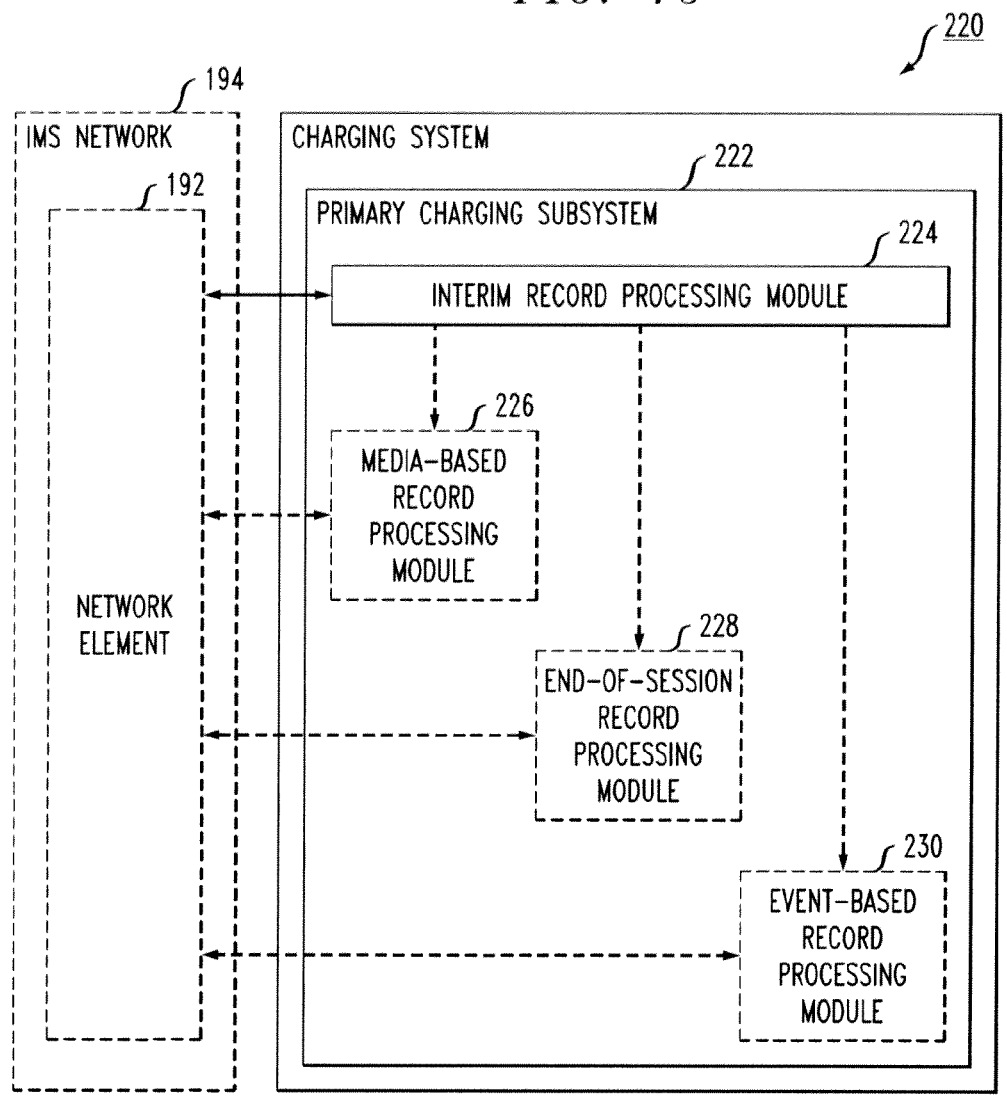
FIG. 19 is a block diagram of still another exemplary embodiment of a charging system for facilitating interim billing for an IMS session.

With reference to FIG. 19, another exemplary embodiment of a charging system 220 for facilitating interim billing for an IMS session includes a primary charging data subsystem 222. The primary charging data subsystem 222 may include any suitable combination of servers, network nodes, and other types of network devices. The first primary charging data subsystems 182 includes a first interim record processing module 224, a media-based record processing module 226, an end-of-session record processing module 228, and an event-based record processing module 230. The media-based record processing module 226 is in operative communication with the first interim record processing module 224 for generating a media-based partial CDR from the primary interim CDR for the IMS session in relation to the first NE 192 in response to receiving a media change accounting message for the IMS session from the first NE 192.

The end-of-session record processing module 228 is in operative communication with the first interim record processing module 224 for generating an end-of-session partial CDR from the primary interim CDR for the IMS session in relation to the first NE 192 in response to receiving a stop accounting message for the IMS session from the first NE 192. The event-based record processing module 230 is in operative communication with the first interim record processing module 224 for generating an event-based partial CDR from the primary interim CDR for the IMS session in relation to the first NE 192 in response to receiving an event accounting message from the first NE 192.

Figure 20:
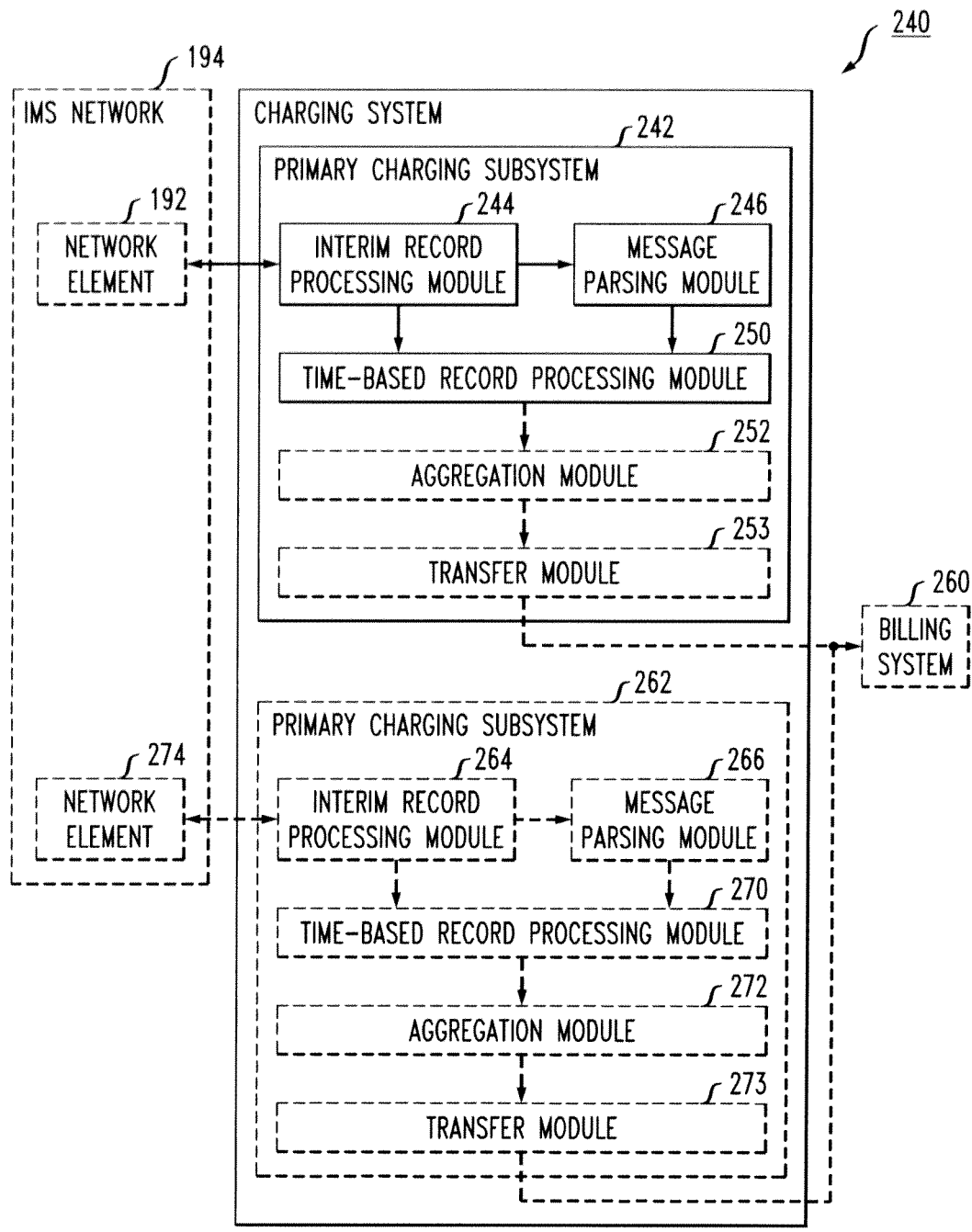
FIG. 20 is a block diagram of still yet another exemplary embodiment of a charging system for facilitating interim billing for an IMS session.

With reference to FIG. 20, another exemplary embodiment of a charging system 240 for facilitating interim billing for an IMS session includes a first primary charging data subsystem 242. The first primary charging data subsystem 242 may include any suitable combination of servers, network nodes, and other types of network devices. The first primary charging data subsystem 242 includes a first interim record processing module 244, a first message parsing module 246, a first time-based record processing module 250, an aggregation module 252, and a transfer module 253. The first aggregation module 252 is in operative communication with the first time-based record processing module 250 for aggregating the primary time-based partial CDR with any other partial CDRs associated with the first NE 192 that were generated by the first primary charging data subsystem 242 during the IMS session and not previously aggregated to form an aggregated partial CDR for the IMS session relating to the first NE 192. The transfer module 253 is in operative communication with the aggregation module 252 for transferring the aggregated partial CDR to a BS 260 to facilitate interim billing of the IMS session in conjunction with each repetition of the first time-based record processing module 250 determining the interim processing trigger has been reached.

Figure 21:
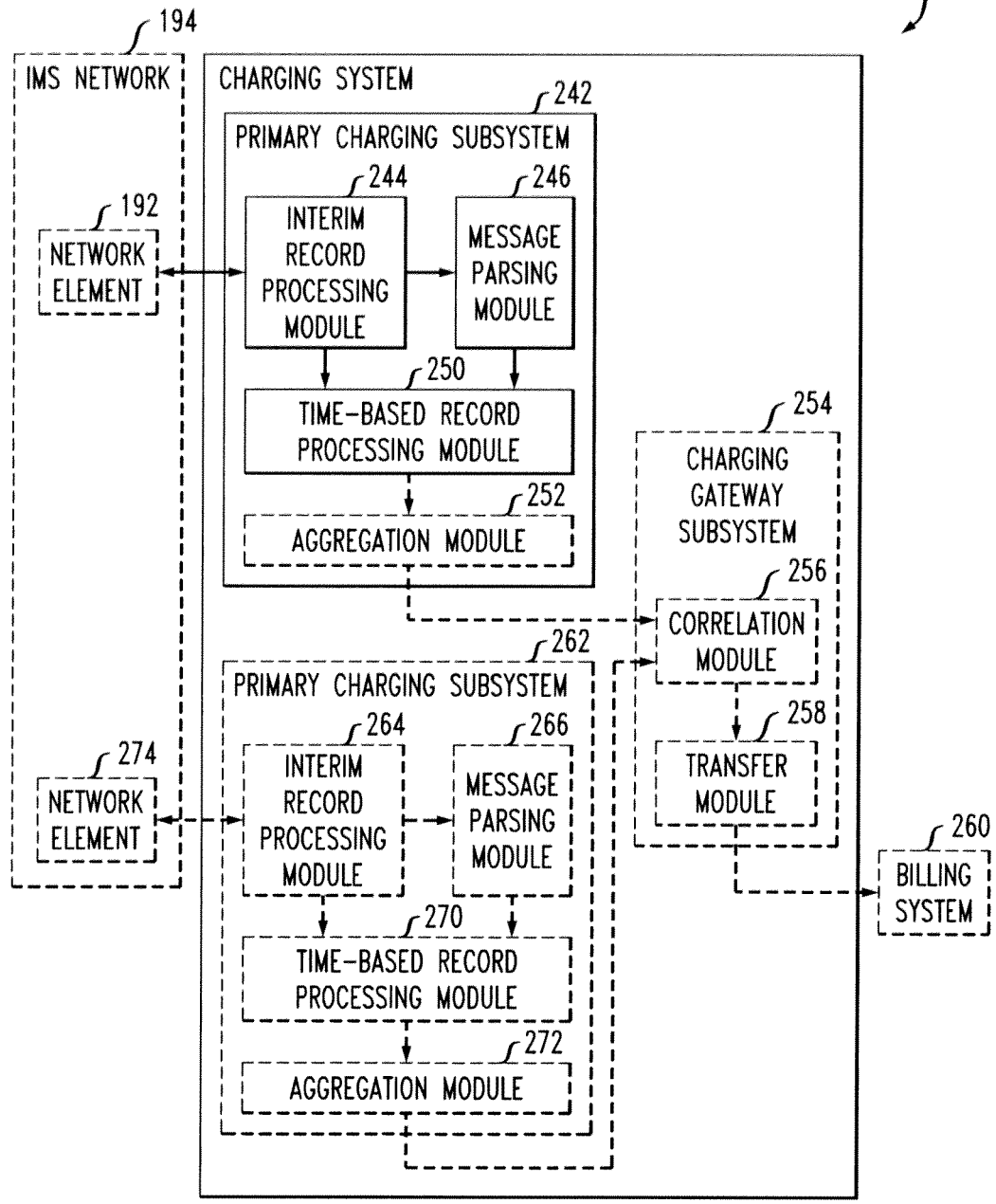
FIG. 21 is a block diagram of another exemplary embodiment of a charging system for facilitating interim billing for an IMS session.

With reference to FIG. 21, the charging system 240 also includes a charging gateway subsystem 254. The charging gateway subsystem 254 may include any suitable combination of servers, network nodes, and other types of network devices. The charging gateway subsystem 254 may be combined or co-located with charging data subsystems (e.g., 242) in any suitable combination of servers, network nodes, and other types of network devices. The charging gateway subsystem 254 including a correlation module 256 and a transfer module 258. The correlation module 256 is in operative communication with the first aggregation module 252 for correlating the first aggregated partial CDR with any other aggregated partial CDRs associated with other NEs of the IMS network that were generated for the IMS session and not previously correlated to form a consolidated partial CDR for the IMS session. The transfer module 256 is in operative communication with the correlation module for transferring the consolidated partial CDR to a BS 260 to facilitate interim billing of the IMS session in conjunction with each repetition of the first time-based record processing module 250 determining the interim processing trigger has been reached.

With continued reference to FIG. 21, the charging system 240 may also include a second primary charging data subsystem 262. The second primary charging data subsystem 262 may include any suitable combination of servers, network nodes, and other types of network devices. The second primary charging data subsystem 262 includes a second interim record processing module 264, a second message parsing module 266, a first time-based record processing module 270, and an aggregation module 272. The second aggregation module 252 is in operative communication with the second time-based record processing module 270 for aggregating the second time-based partial CDR with any other partial CDRs associated with the first NE 192 that were generated by the second primary charging data subsystem 262 during the IMS session and not previously aggregated to form a second aggregated partial CDR for the IMS session relating to the second NE 274.

The second interim record processing module 264 or opens or updates a second interim CDR in response to receiving time-based interim accounting messages for the IMS session from a second NE 274. The second message parsing module 266 is in operative communication with the second interim record processing module 264 and extracts the message sequence number from the time-based interim accounting messages. The message sequence number uniquely identifying each time-based interim accounting message in relation to other interim accounting messages from the second NE 274 for the IMS session. The second time-based record processing module 270 is in operative communication with the second interim record processing module 264 and second message parsing module 266. The second time-based record processing module 270 determines if the interim processing trigger has been reached for the IMS session. If the interim processing trigger has not been reached and the IMS session is still active, the second primary charging data subsystem 262 continues processing time-based interim accounting messages to update the current second interim CDR. Conversely, if the interim processing trigger has been reached, the second time-based record processing module 270 generates a second time-based partial CDR from the second interim CDRs opened and updated by the second interim record processing module 264 since any preceding second time-based partial CDR was generated and the second primary charging data subsystem 262 continues processing time-based interim accounting messages and generating additional primary time-based partial CDRs until the second NE 274 is no longer serving the IMS session or the second primary charging data subsystem 262 experiences an overload or OOS condition.

The second aggregation module 272 is in operative communication with the second time-based record processing module 270. The second aggregation module 272 aggregates the second time-based partial CDR with any other partial CDRs associated with the second NE 274 that were generated by the second primary charging data subsystem 262 during the IMS session to form a second aggregated partial CDR for the IMS session relating to the second NE 274.

In another embodiment, the charging system 240 may also include a charging gateway subsystem 254 with a correlation module 256 and a transfer module 258. The correlation module 256 is in operative communication with the second aggregation module 272 for correlating the first and second aggregated partial CDRs with any other aggregated partial CDRs associated with other NEs of the IMS network serving the IMS session that were generated for the IMS session and not previously correlated to form the consolidated partial CDR for the IMS session. The transfer module 258 is in operative communication with the correlation module 256 for transferring the consolidated partial CDR to a BS 260 to facilitate interim billing of the IMS session in conjunction with each repetition of the first and second time-based record processing modules 250, 270 determining the interim processing trigger has been reached.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method for facilitating interim billing for an IMS session, comprising:

a trigger determining process comprising:

receiving time-based interim accounting messages for an IMS session at select charging data functions from network elements of an IMS network that are serving the IMS session;

opening or updating interim charging data records for each network element serving the IMS session at the select charging data functions using a first processor after receiving the time-based interim accounting messages;

extracting accounting record numbers from the time-based interim accounting messages at the select charging data functions, the accounting record numbers uniquely identifying the corresponding time-based interim accounting message in relation to other interim accounting messages from the corresponding network element for the IMS session; and determining if a partial record closing trigger has been reached at the select charging data functions for the IMS session using a second processor, wherein the partial record closing trigger is a function of the corresponding extracted accounting record number extracted, an accounting-interim-interval value accessible to the select charging data functions, and a partial record closing threshold accessible to the select charging data functions; and a repeating or generating step comprising:
  if the partial record closing trigger has not been reached and the IMS session is still active, repeating the trigger determining process to continue processing time-based interim accounting messages to update the current interim charging data records or, if the partial record closing trigger has been reached, generating time-based partial charging data records for each network element serving the IMS session at the select charging data functions from the corresponding interim charging data records opened and updated by the corresponding select charging data functions since any preceding time-based partial charging data record was generated and repeating the trigger determining process and the repeating or generation step to continue processing time-based interim accounting messages and generating additional time-based partial charging data records until the corresponding network element is no longer serving the IMS session or the corresponding select charging data function experiences a fault condition.

2. The method set forth in claim 1, further comprising:
  at each select charging data function, aggregating the time-based partial charging data records generated in a given occurrence of the repeating or generating step by the corresponding charging data function with any other partial charging data records associated with the corresponding network element that were generated by the corresponding charging data function during the IMS session and not previously aggregated to form aggregated partial charging data records for each network element serving the IMS session in conjunction with each repetition of determining the partial record closing trigger has been reached in the trigger determining process.

3. The method set forth in claim 2, further comprising:
  at each of one or more charging gateway functions, correlating aggregated partial charging data records formed in the aggregating to form a consolidated partial charging data record for the IMS session relating to each charging gateway function; and
  transferring each consolidated partial charging data record from the corresponding charging gateway function to a billing system to facilitate interim billing of the IMS session in conjunction with each repetition of determining the partial record closing trigger has been reached in the trigger determining process.

4. The method set forth in claim 1 wherein the accounting-interim-interval value relates to transmission of time-based interim accounting messages between start and stop accounting messages by network elements for the IMS session and indicates a time interval between each time-based interim accounting message and a preceding start or time-based interim accounting message, the time interval being selected by an IMS service provider for the IMS session;
  wherein the partial record closing threshold defines a time interval between generation of time-based partial charging data records for the IMS session, the time interval being selected by the IMS service provider for the IMS session;
  wherein an expression for the partial record closing trigger comprises:

$$(N) \text{ Modulo } (T/t),$$

where N is the accounting record number, T is the partial record closing threshold, t is the accounting-interim-interval value, and the partial record closing trigger has been reached when the expression is equal to zero.

5. A system for facilitating interim billing for an IMS session, comprising:
  a first charging data subsystem operable to receive time-based interim accounting messages for an IMS session from a first network element of an IMS network serving the IMS session, one or more processors configured to open or update a first interim charging data record after receiving the time-based interim accounting messages, extract accounting record numbers from the time-based interim accounting messages, and to determine if a partial record closing trigger has been reached for the IMS session using a first time-based record processor; and
  a second charging data subsystem operable to receive time-based interim accounting messages for the IMS session from a second network element of the IMS network serving the IMS session, and one or more processors configured to open or update a second interim charging data record after receiving the time-based interim accounting messages, to extract accounting record numbers from the time-based interim accounting messages, and to determine if a partial record closing trigger has been reached for the IMS session;
  wherein the accounting record numbers uniquely identify the corresponding time-based interim accounting message in relation to other interim accounting messages from the corresponding network element for the IMS session;
  wherein the partial record closing trigger is a function of the accounting record number extracted by the corresponding charging data subsystem for the corresponding network element, an accounting-interim-interval value accessible to the corresponding charging data subsystem, and a partial record closing threshold accessible to the corresponding charging data subsystem;
  wherein, if the partial record closing trigger has not been reached and the IMS session is still active, the first and second charging data subsystems continue processing time-based interim accounting messages to update the current first and second interim charging data records or, if the partial record closing trigger has been reached, the first charging data subsystem generates a first time-based partial charging data record for the first network element from the first interim charging data records opened and updated by the first charging data subsystem since any preceding first time-based partial charging data record was generated and continues processing time-based interim accounting messages and generating additional first time-based partial charging data records until the first network element is no longer serving the IMS session or the first charging data subsystem experiences a fault condition and the second charging data subsystem generates a second time-based partial charging data record for the second network element from the second interim charging data records since any preceding second time-based partial charging data record was generated and continues processing time-based interim accounting messages and generating additional second time-based partial charging data records until the second network element is no longer serving the IMS session or the second charging data subsystem experiences a fault condition.

6. The system set forth in claim 5 wherein the first charging data subsystem aggregates the first time-based partial charging data record generated in conjunction with each partial record closing trigger with any other partial charging data records associated with the first network element that were generated by the first charging data subsystem during the IMS session and not previously aggregated to form a first aggregated partial charging data record for the first network element corresponding to each repetition of determining the partial record closing trigger has been reached;

wherein the second charging data subsystem aggregates the second time-based partial charging data record generated in conjunction with each partial record closing trigger with any other partial charging data records associated with the second network element that were generated by the second charging data subsystem during the IMS session and not previously aggregated to form a second aggregated partial charging data record for the second network element corresponding to each repetition of determining the partial record closing trigger has been reached.

7. The system set forth in claim 6, further comprising:

a secondary charging data subsystem operable to receive time-based interim accounting messages for the IMS session from the second network element if the second data charging subsystem develops a fault condition after the second network element performs a failover operation from the second charging data subsystem to the secondary charging data subsystem such that processing of time-based interim accounting messages to open or update first and second interim charging data records, determine if a partial record closing trigger has been reached for the IMS session, generating of the first and second time-based partial charging data records, and forming of the first and second aggregated partial charging data records continue in time relation for the first and secondary charging data subsystems in conjunction with each repetition of determining the partial record closing trigger has been reached after the failover operation.

8. A method for facilitating interim billing for an IMS session, comprising:

a trigger determining processing comprising:
 opening or updating an interim charging data record at a charging data function using an interim record processor in response to receiving a time-based interim accounting message for an IMS session from a network element of an IMS network serving the IMS session;
 extracting a message sequence number from the time-based interim accounting message, the message sequence number uniquely identifying the time-based interim accounting message in relation to other interim accounting messages from the network element for the IMS session; and
 determining if an interim processing trigger has been reached at the charging data function for the IMS session using a time-based record processor, wherein the interim processing trigger is a function of the extracted message sequence number, a message interval value accessible to the charging data function, and an interim processing threshold accessible to the charging data function; and a repeating or generating step comprising:
 if the interim processing trigger has not been reached and the IMS session is still active, repeating the trigger determining process to continue processing time-based interim accounting messages to update the current interim charging data record or, if the interim processing trigger has been reached, generating a time-based partial charging data record at the charging data function from the interim charging data records opened and updated by the corresponding charging data function since any preceding time-based partial charging data record was generated and repeating the trigger determining process and the repeating or generating step to continue processing time-based interim accounting messages and generating additional time-based partial charging data records until the network element is no longer serving the IMS session or the charging data subsystem experiences an overload or out-of-service condition.

9. The method set forth in claim 8 wherein the message interval value relates to transmission of time-based interim accounting messages between start and stop accounting messages by network elements for the IMS session and indicates a predetermined time interval between each time-based interim accounting message and a preceding start or time-based interim accounting message;

wherein the interim processing threshold defines a predetermined time interval between generation of time-based partial charging data records for the IMS session;
 wherein an expression for the interim processing trigger comprises:

$$(N)\ \text{Modulo}\ (T/t),$$

where N is the message sequence number, T is the interim processing threshold, t is the message interval value, and the interim processing trigger has been reached when the expression is equal to zero.

10. The method set forth in claim 8, further comprising:

incrementing a media change count for the network element in relation to the IMS session by one in response to receiving each of one or more media-based interim accounting message from the network element during the IMS session, the media change count being stored in a storage device accessible to the charging data function; and retrieving the media change count from the storage device in conjunction with the determining in the trigger determining process;

wherein the interim processing trigger is also a function of the retrieved media change count.

11. The method set forth in claim 10 wherein an expression for the interim processing trigger comprises:

$$(N-m)\ \text{Modulo}\ (T/t),$$

where N is the message sequence number, m is the media change count, T is the interim processing threshold, t is the message interval value, and the interim processing trigger has been reached when the expression is equal to zero.

12. An apparatus for facilitating interim billing for an IMS session, comprising:

a first primary charging data subsystem operable to receive time-based interim accounting messages for an IMS session from a first network element of an IMS network serving the IMS session, the first primary charging data subsystem comprising:
 a first interim record processor for opening or updating a primary interim charging data record in response to receiving the time-based interim accounting messages for the IMS session from the first network element;
 a first message parsing module in operative communication with the first interim record processor for extracting a message sequence number from the time-based interim accounting messages, the message sequence number uniquely identifying each time-based interim accounting message in relation to other interim accounting messages from the first network element for the IMS session; and a first time-based record processor in operative communication with the first interim record processor, and first message parsing module for determining if an interim processing trigger has been reached for the IMS session, wherein the interim processing trigger is a function of the message sequence number, a message interval value accessible to the first time-based record processor, and an interim processing threshold accessible to the first time-based record processor;

wherein, if the interim processing trigger has not been reached and the IMS session is still active, the first primary charging data subsystem continues processing time-based interim accounting messages to update the current primary interim charging data record or, if the interim processing trigger has been reached, the first time-based record processor generates a primary time-based partial charging data record from the primary interim charging data records opened and updated by the first interim record processor since any preceding primary time-based partial charging data record was generated and the first primary charging data subsystem continues processing time-based interim accounting messages and generating additional primary time-based partial charging data records until the first network element is no longer serving the IMS session or the first primary charging data subsystem experiences an overload or out-of-service condition.

* * * * *